(12) United States Patent
Chou

(10) Patent No.: US 10,959,815 B2
(45) Date of Patent: Mar. 30, 2021

(54) METHOD FOR FABRICATING MAXILLARY TRAY APPLIANCE WITH ANATOMICALLY ALIGNED CONTACTING PORTION

(71) Applicant: Jang-Ching Chou, San Antonio, TX (US)

(72) Inventor: Jang-Ching Chou, San Antonio, TX (US)

(*) Notice: Subject to any disclaimer, the term of this patent is extended or adjusted under 35 U.S.C. 154(b) by 542 days.

(21) Appl. No.: 15/992,073

(22) Filed: May 29, 2018

(65) Prior Publication Data

US 2018/0338819 A1    Nov. 29, 2018

Related U.S. Application Data

(63) Continuation-in-part of application No. PCT/US2018/033558, filed on May 19, 2018, and a
(Continued)

(51) Int. Cl.

| G06T 17/00 | (2006.01) |
|---|---|
| A61C 9/00 | (2006.01) |
| A61C 13/00 | (2006.01) |
| A61C 7/00 | (2006.01) |
| A61C 7/08 | (2006.01) |
| A61C 19/05 | (2006.01) |
| A61C 13/01 | (2006.01) |
| G06T 19/00 | (2011.01) |
| G06F 30/00 | (2020.01) |

(Continued)

(52) U.S. Cl.
CPC .......... *A61C 9/0046* (2013.01); *A61C 7/002* (2013.01); *A61C 7/08* (2013.01); *A61C 13/0004* (2013.01); *A61C 13/01* (2013.01); *A61C 19/05* (2013.01); *G06F 30/00* (2020.01); *G06T 19/00* (2013.01); *G06T 19/20* (2013.01); *A61C 9/0006* (2013.01); *A61C 9/0053* (2013.01); *A61C 11/00* (2013.01); *G06T 2207/00* (2013.01); *G06T 2219/2004* (2013.01)

(58) Field of Classification Search
CPC ..... A61C 9/0046–9/0073; A61C 13/00–13/34; G06T 17/00–17/30; G06T 19/00–19/20; G06T 2207/30036

See application file for complete search history.

(56) References Cited

U.S. PATENT DOCUMENTS

| 2,618,853 A | 11/1952 | Singer et al. |
|---|---|---|
| 4,227,877 A | 10/1980 | Tureaud et al. |

(Continued)

OTHER PUBLICATIONS

Han et al., "Design and fabrication of complete dentures using CAD/CAM technology", Medicine (Baltimore), Jan. 2017; 96(1): e5435; Published online Jan. 10, 2017; pp. 1-13, Published by Wolters Kluwer Health, Inc. (Year: 2017).*

*Primary Examiner* — Brian Werner

(74) *Attorney, Agent, or Firm* — Louis Ventre, Jr.

(57) ABSTRACT

A method of making a maxillary tray appliance comprises obtaining a first virtual model of an edentulous maxillary gum of a patient, and obtaining a virtual component, where the virtual component comprises a virtual contacting surface. The method further comprises receiving the first virtual model, aligning the first virtual model or the virtual component in 3D space, generating a virtual tray appliance, and fabricating a maxillary tray appliance using the virtual tray appliance.

18 Claims, 28 Drawing Sheets

Related U.S. Application Data continuation-in-part of application No. PCT/US2018/022243, filed on Mar. 13, 2018.

(60) Provisional application No. 62/512,075, filed on May 29, 2017.

(51) Int. Cl.
*G06T 19/20* (2011.01)
*A61C 11/00* (2006.01)

(56) References Cited

U.S. PATENT DOCUMENTS

| | | |
|---|---|---|
| 8,376,738 B2 | 2/2013 | Wagner |
| 8,459,990 B2 | 6/2013 | Massad |
| 9,498,310 B2 | 11/2016 | Takeo et al. |
| 2010/0297572 A1 | 11/2010 | Kim |

* cited by examiner

METHOD FOR FABRICATING MAXILLARY TRAY APPLIANCE WITH ANATOMICALLY ALIGNED CONTACTING PORTION

CROSS-REFERENCE TO RELATED APPLICATIONS

This application is a continuation-in-part of International Application No. PCT/US18/22243, filed 13 Mar. 2018, and International Application No. PCT/US18/33558, filed 19 May 2018, which claims the benefit of U.S. Provisional Application No. 62/512,075, filed 29 May 2017, which are all hereby incorporated herein in their entirety.

TECHNICAL FIELD

In the field of dentistry, a method is disclosed that is useful in fabricating dental prostheses, and in dental diagnosis where it is advantageous to fabricate a maxillary tray appliance with anatomically aligned contacting portion and/or tooth form(s), with particularly useful application to an individual that is edentulous in at least a maxillary jaw.

BACKGROUND ART

A typical individual, or patient, has both a mandible (lower jaw or jawbone) and a maxilla (upper jaw). The lower jawbone is the strongest and lowest bone in the human face and it holds the lower teeth in place. The mandible is the only movable bone in the human skull and it is positioned beneath the maxilla. The mandible rotates about a hinge axis. The mandible may also undergo translational movement, i.e. moving forward, left, right, upward, downward etc.

Traditionally, making, for example, dentures takes at least 5 appointments, and include various steps, such as obtaining impressions, fabricating wax rims, adjusting the wax rims, setting teeth, and fabricating dentures.

Other methods include use of edentulous tray systems with bite determining assemblies. One such edentulous tray system includes a pin and striking plate assembly, such as described in U.S. Pat. No. 8,070,489 to Massad. Another edentulous tray system includes projecting parts located on lateral portions of maxillary and mandibular trays, such as described in U.S. Pat. No. 9,498,310 to Suga.

SUMMARY OF INVENTION

A method is provided for fabricating a maxillary tray appliance for obtaining a jaw registration on a patient who has an edentulous maxillary gum. The maxillary tray appliance is fabricated to have an anatomically aligned contacting portion based on computer aided fabrication. The maxillary tray appliance may additionally be utilized for taking an impression of the edentulous maxillary gum of the patient. The method includes obtaining, by a digitizer, a first virtual model of the edentulous maxillary gum of the patient; obtaining, from a data base, a virtual component, where the virtual component includes a virtual contacting surface, where the virtual contacting surface may be either ridge type, plate type, or pin type.

The method may further include the steps of receiving, by a computing device, the first virtual model; aligning, by the computing device, the first virtual model or the virtual component in 3D space; generating, by the computing device, a virtual tray appliance; and fabricating, by a fabricator, the maxillary tray appliance using the virtual tray appliance.

The method may include the steps of: decimating, by the computing device, the first virtual model to obtain a second virtual model; defining, by the computing device, a first region of interest on a palatal portion of the second virtual model; selecting, by the computing device, a best fitting palatal form from a library of palatal forms; determining, by the computing device, a transformation matrix based on the best fitting palatal form; and/or generating, by the computing device a virtual base portion based on the first virtual model. The step of aligning may be based on the transformation matrix.

The first region of interest may be at least 900 millimeters squared in size. The first region of interest may extend no further than the edentulous ridge crest anteriorly and laterally, and extending no further than the soft palate (and more preferably no further than the vibrating line) posteriorly.

The method may further optionally include the steps of: relieving, by the computing device, the first virtual model; and/or modifying, by the computing device, the virtual component.

The step of aligning may be based on a virtual model reference plane; the virtual model reference plane may be defined by: (a) a virtual model left hamular notch, (b) a virtual model right hamular notch, and (c) a virtual model incisive papilla. The virtual model reference plane serves to provide an anatomical based estimate of the orientation of the camper's plane of the patient. Alternative landmarks may be utilized for defining the virtual model reference plane, such as a palatal region, a palatal vault region, a premaxilla region, an incisive papilla region, a edentulous ridge region, and the like.

The virtual model reference plane may be substantially parallel with the virtual contacting surface in cross sectional view. The virtual model reference plane may be between 5 degrees and 20 degrees from the virtual contacting surface in cross sectional view. The step of aligning may be based on user input. The step of aligning may be based on an automatic aligning process. The automatic aligning process may be an iterative closest point algorithm. The step of selecting may be based on an automatic selecting process. The automatic selecting process may be a fuzzy correspondences method;

The library of palatal forms may be created by the steps of: obtaining a virtual dentate maxillary arch; virtually positioning the virtual dentate maxillary arch; saving the virtual dentate maxillary arch; and repeating for a next virtual dentate maxillary arch; optionally determining a virtual maxillary palatal form on the virtual dentate maxillary arch.

When the virtual contacting surface is the ridge type or plate type, the virtual contacting surface may be substantially straight in cross sectional view; and/or the virtual contacting surface may be between 3 millimeters and 20 millimeters in a maxillary incisal direction from the virtual incisive papilla.

The virtual component may define at least one tooth form. The at least one tooth form may be a first premolar tooth form. The first premolar tooth form may have no lingual cusp.

Optionally, there may be at least two virtual components stored in the data base, each being morphologically distinct, and each may be associated with distinct palatal forms within the library of palatal forms.

Technical Problem

In the field of dentistry, it is a problem that the process of making a dental prosthesis for a patient with an edentulous maxillary jaw is difficult, time consuming, and prone to failure. For example, making a set of dentures typically takes at least five appointments. Utilizing stock impression trays, that is, impression trays that are pre-made and not individualized to fit the edentulous maxillary gum of the patient is prone to failure because of "over-extension" of the impression. That is, the impression will push too hard on the patient's cheeks, and the resultant prosthesis will be too large. Additionally, many patients have large maxillary tuberosities and/or large maxillary edentulous ridges, so there is little room in the mouth for components of current tray systems. Some currently available tray systems are prone to falling off in the patient's mouth because it is too heavy or too large. Some currently available tray systems do not allow an accurate occlusal vertical dimension to be provided to the patient. Some currently available tray systems do not allow point of contact between a maxillary tray and mandibular tray to be near the mid-sagittal plane of the patient's head, leading to off-center contact and inaccurate jaw registration. Some currently available tray systems do not allow for the patient and/or the clinician to view tooth forms in the mouth.

Some currently available tray systems do not allow tooth forms to be placed in anatomically suitable locations. Some currently available tray systems do not allow for rotational freedom and/or translational freedom, such as being able to be used for patients with anatomical differences from the norm. Some computer-implemented processes are time consuming and/or labor intensive. If a maxillary tray appliance with contacting portion and/or tooth form(s) is used to take an impression of the edentulous maxillary jaw, the contacting portion and/or the tooth form(s) will be prone to being misaligned to the patient's face because impression material typically pools in a posterior portion of the maxillary tray appliance (since clinicians typically push harder in an anterior portion than the posterior portion).

It is also a known problem that client based dental computing software is expensive, time consuming, and/or difficult to train auxiliary staff to operate.

Solution to Problem

The solution is a method of making a maxillary tray appliance and/or a mandibular tray appliance which accurately captures optimal displacement of musculature, and/or which accounts for rotational and/or translational differences from the norm, and/or which accurately provides a suitable occlusal vertical dimension to the patient regardless of anatomical variation, and/or which provides an accurate jaw registration procedure, and/or which allows for visualization of tooth forms, and/or which allows for a fast and accurate computer-implemented process, and/or which compensates for pooling of impression material in the posterior portion of the maxillary tray appliance. The method may also allow for unitary piece formation of the maxillary tray appliance, which may allow the maxillary tray appliance to be lighter in weight, smaller in size, better fitting to the patient's intra-oral anatomical structure(s), less prone to deformation when the patient bites down, and/or not prone to slipping when the patient bites down. The method also allows for network transfer of data such that 3D generation of virtual model(s) and/or fabrication of the maxillary tray appliance and/or the mandibular tray appliance can be done off site.

BRIEF DESCRIPTION OF DRAWINGS

The drawings illustrate preferred embodiments of the tray appliance system for making a dental prosthesis according to the disclosure. The reference numbers in the drawings are used consistently throughout. New reference numbers in FIG. 2 are given the 200 series numbers. Similarly, new reference numbers in each succeeding drawing are given a corresponding series number beginning with the figure number.

DESCRIPTION OF EMBODIMENTS

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and; therefore; other embodiments may be utilized and structural; and operational changes may be made; without departing from the scope of the present invention.

A method for fabricating a tray appliance system for use in providing dental services is disclosed. The method, also referred to as a tray method (3800) includes a model obtaining step (3805), a model receiving step (3807), a component obtaining step (3810), a decimating step (3815), a defining step (3820), a selecting step (3825), a determining step (3830), an aligning step (3835), a relieving step (3840), a base portion generating step (3845), a modifying step (3850), a virtual tray generating step (3855), and a fabricating step (3860).

Figure 37:
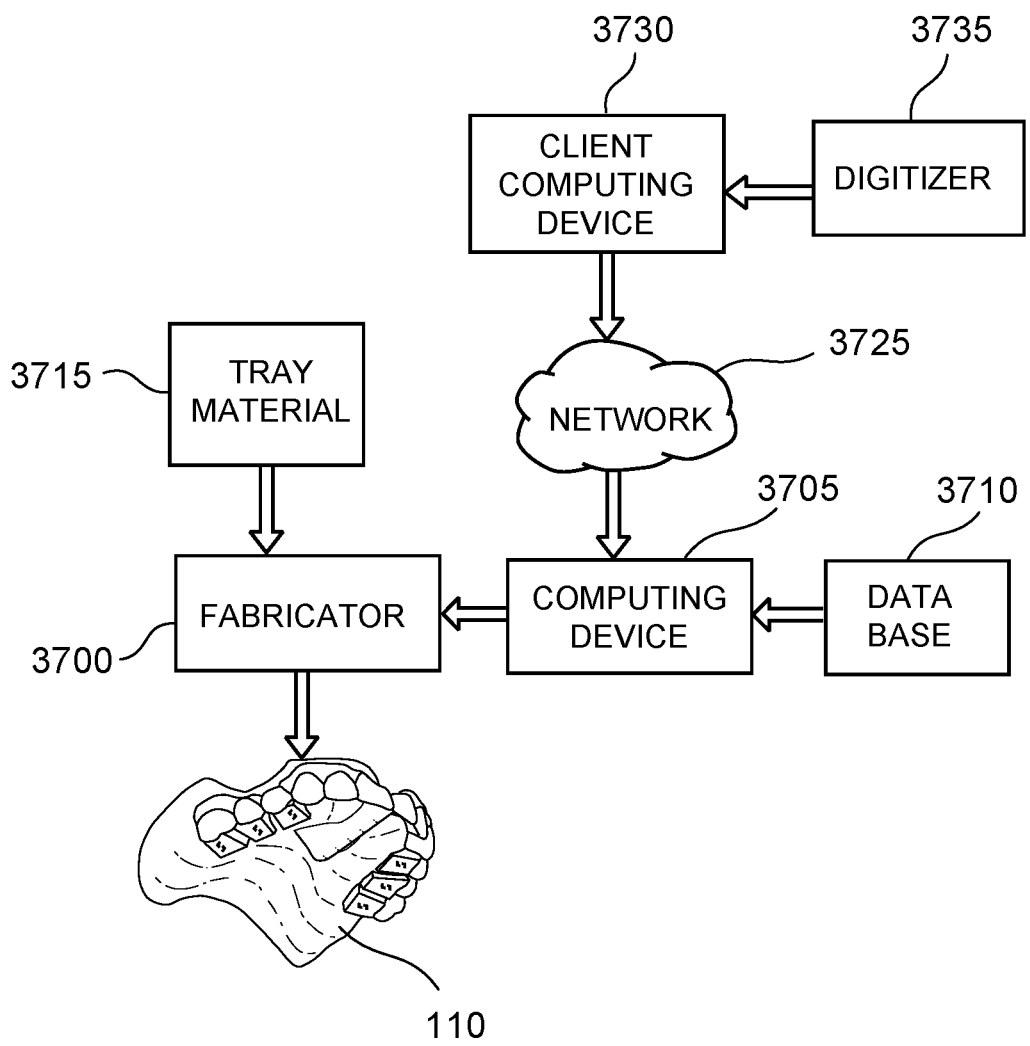
FIG. 37 is a diagrammatic view of an exemplary tray fabricating system that can be used to implement various exemplary embodiments.

As shown in FIG. 37, the tray method (3800) is preferably performed by a computing device (3705). An exemplary tray fabricating system, shown in FIG. 37 includes a fabricator (3700), the computing device (3705), a data base (3710), a tray material (3715), a network (3725), a client computing device (3730), and a digitizer (3735).

As used herein, the term "fabricator" or "fabrication process" refers to machines and processes capable of forming three-dimensional shapes from a virtual model.

As used herein, the term "virtual model", "3D model", and "3D virtual model" refers to electronic data stored in volatile or non-volatile medium representative of one or more three-dimensional shape(s).

The fabrication process is performed under computer control based on the virtual model and forms a tray appliance, such as the maxillary tray appliance (110) and/or the mandibular tray appliance (1610) from the tray material (3715).

The tray material (3715) can be any material, formable media, or jettable media suitable for forming an appliance for use in the mouth (3515) of the patient (3505).

The fabricator (3700) may be any fabricator (3700) known in the art, such as, for example, any addition type fabricator (3700) or subtraction type fabricator (3700).

The fabricator (3700) may be an addition type fabricator, such as any 3D printer known in the art, such as, for example, 3D printer utilizing fused filament fabrication (FFF), stereolithography (SLA), digital light processing (DLP), fused deposition modeling (FDM), selective laser sintering (SLS), selective laser melting (SLM), electronic beam melting (EBM) type processes, and the like.

For example, one suitable addition type fabricator (3700) is "ULTIMAKER 3" manufactured by ULTIMAKER of Geldermalsen, Netherlands.

Suitable tray material (3715) for use with this fabricator (3700) include polyactic acid (PLA) filament, acrylonitrile butadiene styrene (ABS) filament, and the like.

Another suitable 3D printer is "FORM 2" manufactured by FORMLABS of Somerville, Mass. Suitable tray material (3715) for use with this fabricator (3700) includes photo-curable resins, such as polyurethane acrylate based photo-curable resins.

It is also contemplated that other materials, such as metals may be utilized in the 3D printer, such as through a selective laser sintering (SLS) process.

The fabricator (3700) may be a subtraction type fabricator, and may be, for example a 3 axis, 4 axis, 5 axis, or any other multi-axis milling machine and the like.

For example, one suitable subtraction type fabricator (3700) is "DATRON D5" manufactured by DATRON DYNAMICS of Milford, N.H. Suitable tray material (3715) for this subtraction type fabricator (3700) include polymethylmethacrylate, acrylic resin, composite resin, silicone, metal, and the like.

The fabricator (3700) may communicate with the computing device (3705) and/or the client computing device (3730) through known methods, such as a universal serial bus (USB). The fabricator (3700) may incorporate its own internal processor operable to execute software commands for controlling various components. As is known in the art, the fabricator (3700) may not be connected to the computing device (3705) and/or the client computing device (3730), and software commands and/or data may be transferred from the computing device (3705) and/or the client computing device (3730) through physical media, such as through secure digital (SD) card.

The data base (3710) serves to store in non-volatile memory various virtual components that will be discussed in more detail later.

In one aspect, the computing device (3705) may communicate with the data base (3710) that is part of the computing device (3705). In another aspect, the data base (3710) may be contained in a separate storage device. In yet another aspect, the data base (3710) may be accessible in off site storage, such as in the "cloud" using internet access schemes. Similarly, the client computing device (3730) may communicate with the computing device (3705) through the network (3725). The network (3725) may be a local area network (LAN), a wide area network (WAN), the internet, or any other suitable network architecture.

The computing device (3710) and/or the client computing device (3730) may execute software that allows a user to obtain, receive, decimate, design, align, relieve, and/or generate virtual 3D data. The software may also allow the user to measure, visualize, combine, add color to the virtual 3D data and/or other functions.

In one aspect, the computing device (3710) and/or the client computing device (3730) may generate virtual representation of the tangible tray, and the virtual representation may be used to fabricate the tangible tray by way of the fabricator (3700). In another aspect, the computing device (3710) and/or the client computing device (3730) may generate instructions (such as G-code instructions) to be used to fabricate the tangible tray by way of the fabricator (3700).

The computing device (3710) and/or the client computing device (3730) may be any computing device known in the art, such as desktop computing device, laptop computing device, workstation, server, tablet device, smart phone, system on chip device, and the like.

Unless otherwise required in the context, the term "comprise" appearing in the description and the whole text of the appended claims will be interpreted as open inclusion, i.e., interpreted as "including, but not limited to."

The digitizer (3735) may be any digitizer known in the art, such as, for example, intra-oral digitizers (such as optical, laser, touch, and/or ultrasonic digitizers), extra-oral digitizers (such as optical, laser, touch, and/or ultrasonic digitizers), cone beam computer tomography (CBCT) machines, computer tomography (CT) machines, ultrasonic units and the like.

For example, the digitizer (3735) may be used in an indirect method (that is, not directly scanning within the mouth of the patient (3505)). For example, a preliminary impression of the edentulous maxillary gum of the patient may (3505) be taken using a material such as alginate impression material on an impression tray. The impression may then be digitized using the extra-oral digitizer (such as optical or laser scanner). Any alternative indirect methods may also be utilized, such as, for example, pouring the impression of the edentulous gum, and digitizing (such as through optical or laser scanning) using the extra-oral digitizer.

The tray appliance system is for making a dental prosthesis, which may be, for example, a maxillary denture, a set of dentures (3600), a dental implant supported prosthesis, a dental implant supported bridge, and the like, for a patient (3505). This is a tray appliance system for a human patient. For purposes of context, the patient (3505) has a mouth (3515) defined by a maxillary jaw (3510) and a mandibular jaw (3520). Additionally, the patient (3505) has an edentulous maxillary gum. The tray appliance system includes at a minimum a maxillary tray appliance (110) and optionally also includes a mandibular tray appliance (1610).

Throughout this description, the term "impression material" may indicate any type of impression material suitable for taking an impression within the mouth (3515) of the patient (3505). Suitable impression materials include, but are not limited to, alginate type impression materials, silicone type impression materials, rubber base type impression materials, wax base impression materials, and the like.

Throughout this disclosure, the horizontal plane is defined as the Camper's plane when the maxillary tray appliance (110) is fitted to the mouth (3515) of the patient (3505). It is known in the field of dentistry that Camper's plane is also known as the Ala-tragus plane, and is often used as a horizontal reference plane. Additionally, the terms "higher" and "lower" as used to indicate vertical positioning is measured relative to the horizontal plane.

Figure 1:
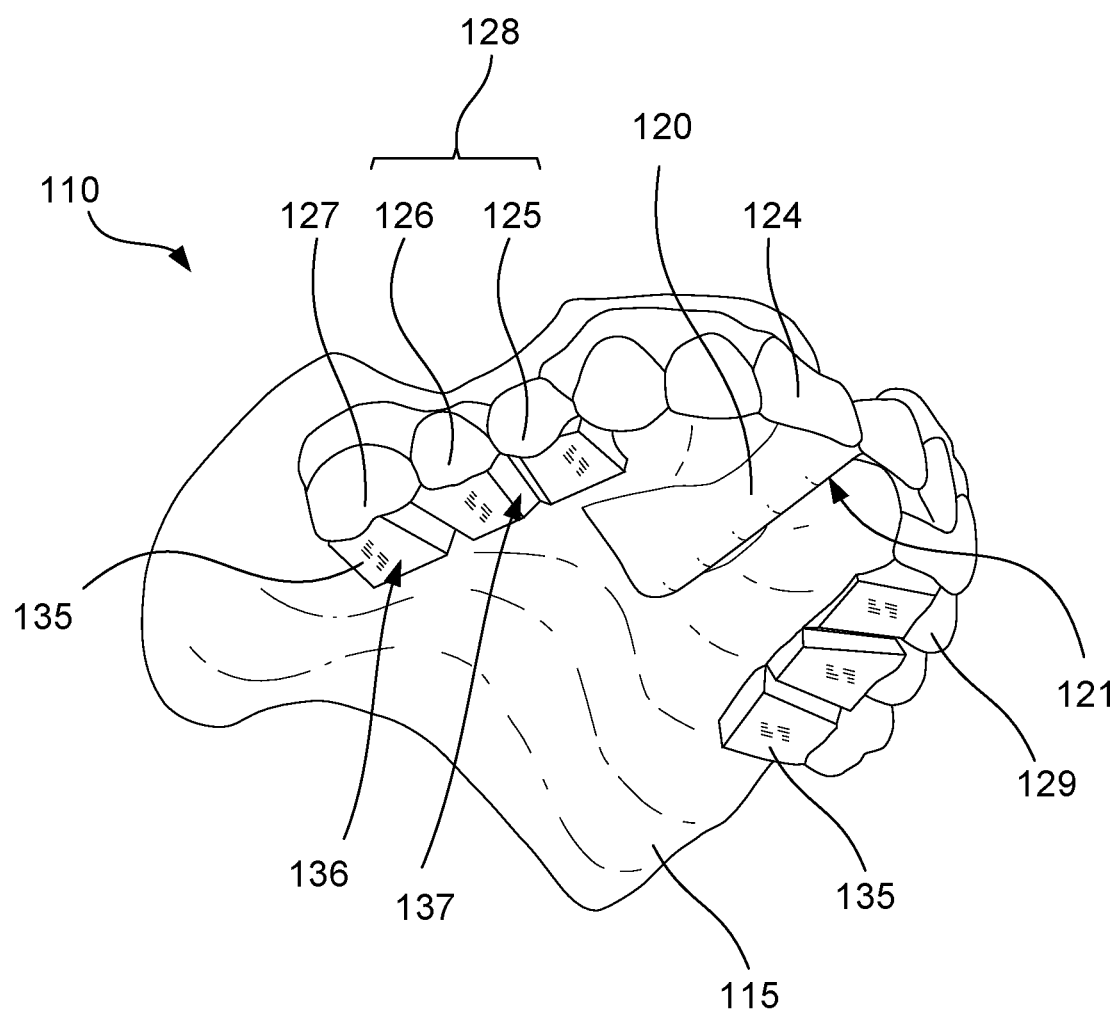
FIG. 1 is a bottom right perspective view of the tray appliance system including a maxillary tray appliance.

As shown in FIG. 1, the maxillary tray appliance (110) includes a first base portion (115), optionally a first premolar tooth form (125), optionally a central incisor tooth form (124), optionally a contralateral first premolar tooth form (129), optionally a first contacting portion (120), and optionally a first bite material accepting portion (135).

The maxillary tray appliance (110) may additionally optionally include a second premolar tooth form (126), a first molar tooth form (127), and/or other tooth form(s) (not marked).

Figure 2:
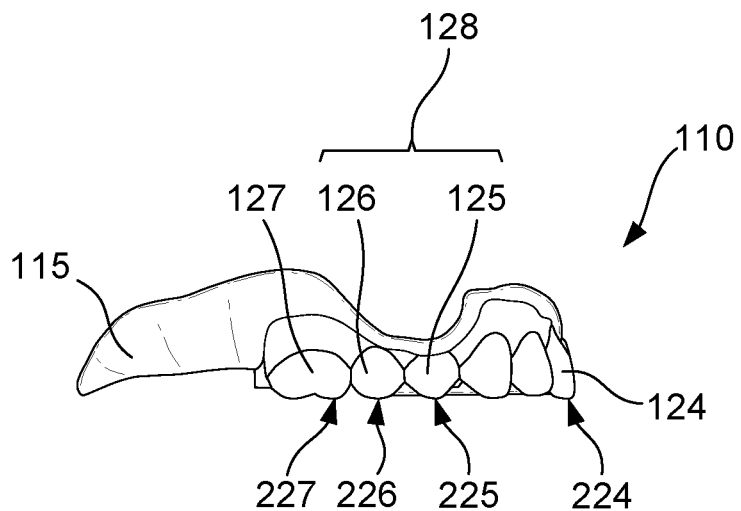
FIG. 2 is a right side perspective view of the maxillary tray appliance of FIG. 1.

As best shown in FIG. 2, the first premolar tooth form (125) defines a first premolar cusp tip (225). The second premolar tooth form (126), when present, defines a second premolar cusp tip (226). The first molar tooth form (127), when present, defines a first molar cusp tip (227). Specifically, the first molar cusp tip (227) indicates a mesio-buccal cusp tip of the first molar tooth form (127).

The first contacting portion (120), as shown in FIG. 1 and when present, is contoured to make contact with a contacting surface originating from the mandibular jaw (3520) of the patient (3505). The contacting surface may be a portion of either: (1) the mandibular tray appliance (1610), or (2) a mandibular anterior tooth, or (3) the mandibular gum (410).

Figure 5:
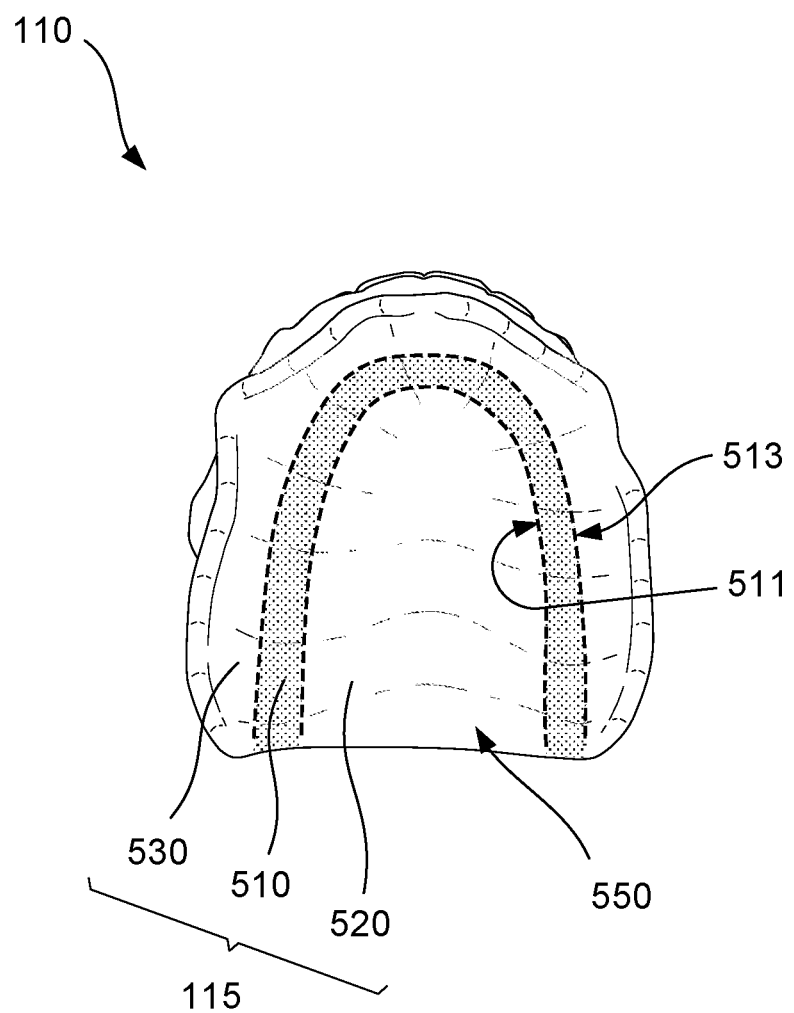
FIG. 5 is a top perspective view of the maxillary tray appliance of FIG. 1.

As shown in FIG. 5, the first base portion (115) includes a first U-shaped portion (510) being substantially U shaped in top view. The first U-shaped portion (510) is shown as shaded in FIG. 5. The first U-shaped portion (510) includes a lingual side (511) and a buccal side (513), both of which are marked with thick dashed lines, respectively. The term "substantially" is intended to subsume shapes that are U-shaped but may be interrupted. Thus, in this instance the first U-shaped portion (510) would be substantially U shaped if, in some embodiments, there are one or more apertures (not shown) defined by the first base portion (115). Therefore, the U shape of the first U-shaped portion (510) may be broken. Thus, the term "substantially U shaped," as used herein, means and includes a shape which has a continuous or a discontinuous U shape.

Figure 8:
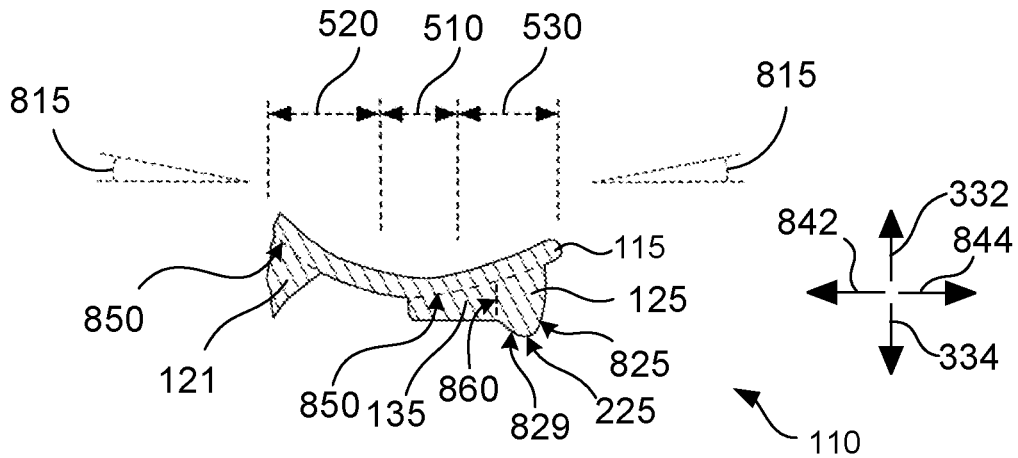
FIG. 8 is a cross-sectional view through section 8-8 of FIG. 7.

As shown in FIG. 5 and FIG. 8, the first U-shaped portion (510) of the first base portion (115) has an upward slope of no more than 10 degrees in bucco-lingual cross sectional view. The first base portion (115) further includes a first lingual portion (520) extending upwardly with slope of at least 10 degrees (815) from the lingual side (511) of the first U-shaped portion (510) (see also FIG. 8). The first base portion (115) may additionally include a first buccal portion (530) extending upwardly with slope of at least 10 degrees (815) from the buccal side (513) of the first U-shaped portion (510).

As shown in FIG. 8, the first lingual portion (520) advantageously serves to follow the contour of the edentulous maxillary gum of the patient (3505) such that the maxillary tray appliance (110) is in a desired proximity to the edentulous maxillary gum when fitted within the mouth (3515) of the patient (3505).

The first buccal portion (530), when present, may serve to provide additional surface area such that the maxillary tray appliance (110) may be held in place to the edentulous maxillary gum of the patient (3505) without the maxillary tray appliance (110) being dislodged. Alternatively, when the maxillary tray appliance (110) is being used to carry impression material, the first buccal portion (530) provides additional support for impression material such that the impression material may be carried into the area between the edentulous gum and inner cheek, known commonly as the vestibule of the patient (3505).

When the maxillary tray appliance (110) is to be used to carry impression material for the purpose of taking an impression of the edentulous maxillary gum of the patient (3505), the impression material is placed on a first top surface (550) of the first base portion (115).

Similarly, when the mandibular tray appliance (1610) is to be used to carry impression material for the purpose of taking an impression of the edentulous mandibular gum of the patient (3505), the impression material is placed on a second bottom surface (1750) of the second base portion (1615).

It is preferred, but not essential the maxillary tray appliance (110) is a unitary piece, which means that it is made with all its portions being formed together as a unified whole. It is also preferred, but not essential that the mandibular tray appliance (1610) is a unitary piece. The maxillary tray appliance (110) may also be formed in two or more pieces, removably attached to each other using any attachment means, such as a hub and receptacle element, a clip element, a magnet, and the like.

The maxillary tray appliance (110) formed in two or more pieces may advantageously serve to allow for components of different sizes, shapes, and/or color to be utilized. For example, the first contacting portion (120) may be removably attached to the first base portion (115) such that multiple different sizes of first contacting portion (120) may be utilized. Similarly, the mandibular tray appliance (1610) may also be formed in two or more pieces.

The maxillary tray appliance (110) may be custom made to fit the edentulous maxillary gum of the patient (3505). When the maxillary tray appliance (110) is a unitary piece and custom made to fit the edentulous maxillary gum of the patient (3505), for example, the maxillary tray appliance (110) may be easier to manufacture than fabricating the maxillary tray appliance (110) in two or more pieces.

In some embodiments, the maxillary tray appliance (110) may be made, at least in part using a thermoplastic material, that is, a material which is substantially rigid at room temperature, but moldable at an elevated temperature, the elevated temperature being not so high as to burn the patient (3505). For example, suitable thermoplastic materials include, but are not limited to, polystyrene, polymethyl methacrylate, polytetrafluoroethylene, dental compound, and the like.

In some embodiments, different portions of the tray appliance may have different thermoplastic properties, for example, the first contacting portion (120) may have a higher melting temperature than, for example, the first base portion (115). This can be achieved in any known processes, such as, for example, dual shot injection molding, over-molding, and the like utilizing at least two materials. For example, a first material may be a material with a higher melting range, such as acrylonitrile butadiene styrene (ABS), which has a melting range of about 105° C. while a second material may be a material with a lower melting range, such as expanded polystyrene (EPS), which has a melting range of about 62° C. This advantageously allows the first base portion (115) to deform to adapt to the jaw size of the patient (3505), while preserving the shape of other portion(s) such as the first contacting portion (120), the first premolar tooth form (125), the first bite material accepting portion (135), and the like.

When the maxillary tray appliance (110) is made using at least one thermoplastic material, the maxillary tray appliance (110) may be custom formed in the mouth (3515) of the patient (3505).

In FIG. 8, direction arrows show a lingual (842) direction and a buccal (844) direction. A first base portion boundary (850) is marked with dashed lines. Since the maxillary tray appliance (110) is shown in a unitary piece formation, the first base portion boundary (850) is hypothetical because in some embodiments, it may not be a physical separation, but rather a designation to show what the portion would look like separated from its integration in the maxillary tray appliance (110). As described previously, the first base portion (115) is preferably 0.5 millimeters to 5 millimeters in thickness.

Figure 7:
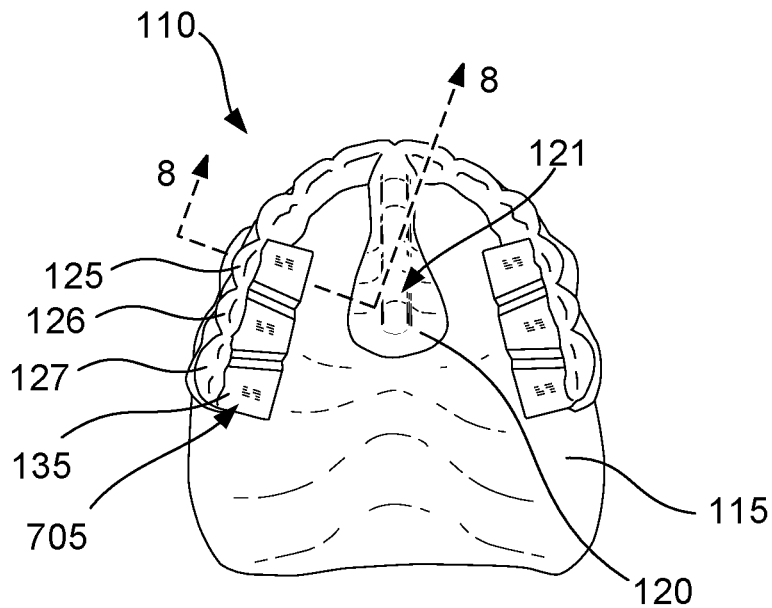
FIG. 7 is the bottom perspective view of FIG. 6 showing location of the first contacting portion.

As best shown in FIG. 7, in some embodiments, the first bite material accepting portion (135) may be abutted against a tooth form (e.g. first premolar tooth form (125)).

Figure 14:
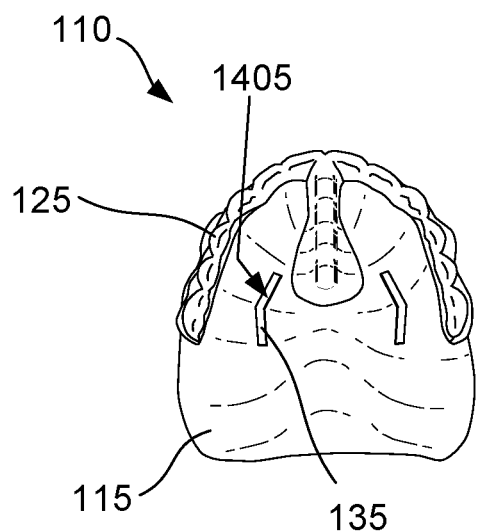
FIG. 14 is a bottom perspective view of an embodiment of the maxillary tray appliance with V shaped form first bite material accepting portion according to the embodiment of FIG. 6.
Figure 15:
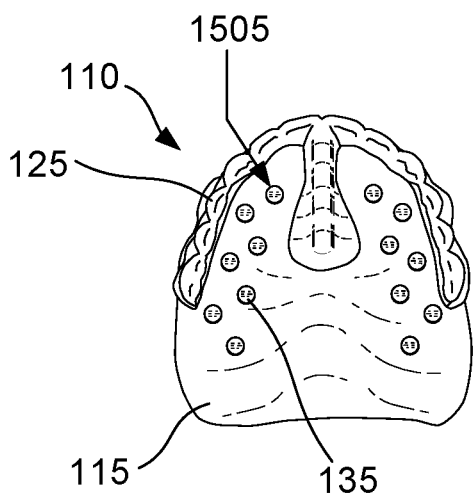
FIG. 15 is a bottom perspective view of an embodiment of the maxillary tray appliance with cylindrical form first bite material accepting portion according to the embodiment of FIG. 6.

As shown in FIG. 14 and FIG. 15, in some embodiments, the first bite material accepting portion (135) may not be in contact with the tooth form (e.g. first premolar tooth form (125)).

In FIG. 8, a tooth form boundary (860) is marked with a dashed line to show the theoretical boundary between the first premolar tooth form (125) and the first bite material accepting portion (135). The tooth form boundary (860) is defined as a vertically extending theoretical boundary extending from a lingual end of the tooth form (such as the first premolar tooth form (125) to the first base portion (115)).

Additionally, as shown in FIG. 1, the premolar tooth forms (128) mean and include the first premolar tooth form (125) and the second premolar tooth form (126).

Figure 33:
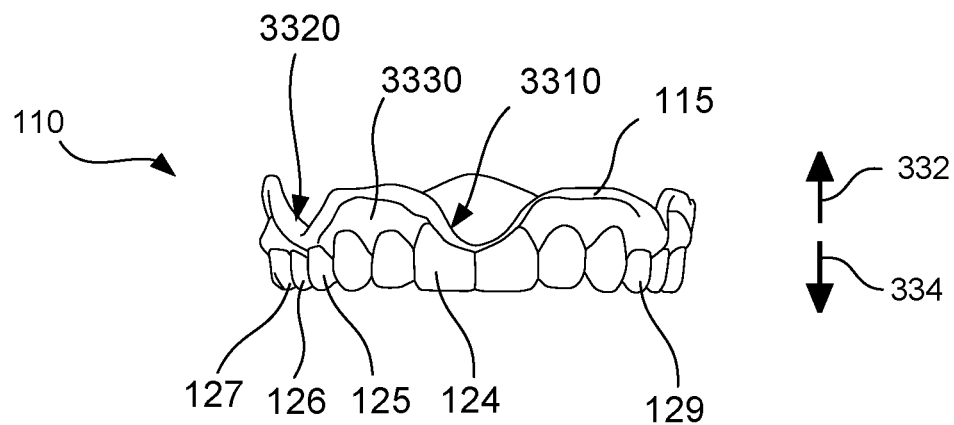
FIG. 33 is a front perspective view of the maxillary tray appliance of FIG. 1.
Figure 34:
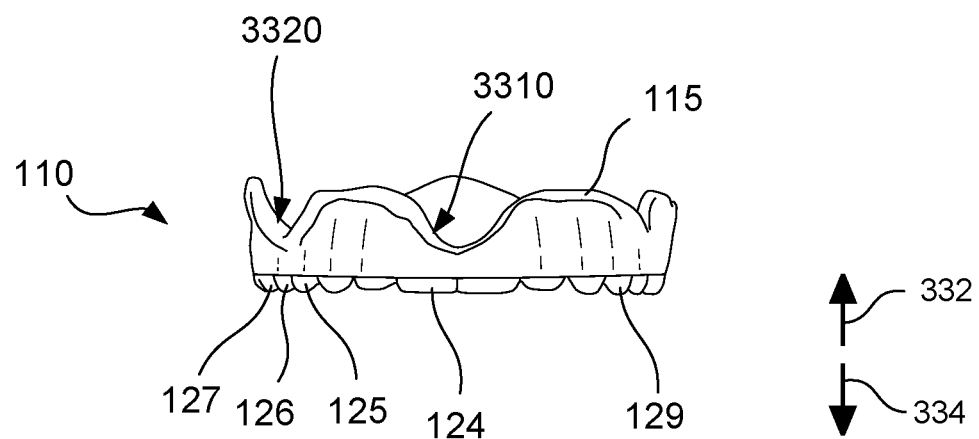
FIG. 34 is a front perspective view of an embodiment of the maxillary tray appliance having tooth forms defining facial contour with at least incisal 2 millimeters of facial surface of natural or artificial tooth according to the embodiment of FIG. 33.
Figure 35:
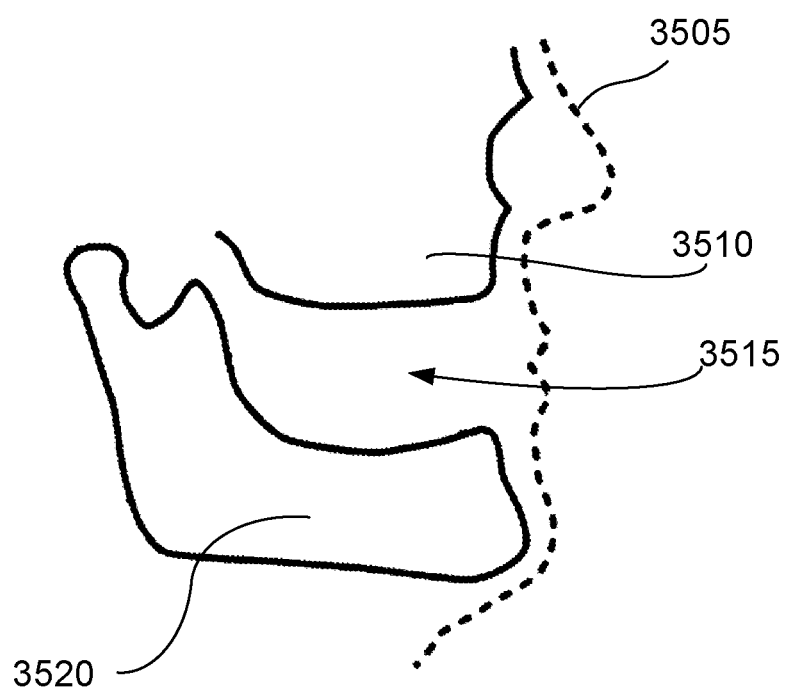
FIG. 35 is a partial side view of the head of a patient showing the relative location of the mouth, the maxillary jaw and the mandibular jaw.
Figure 36:
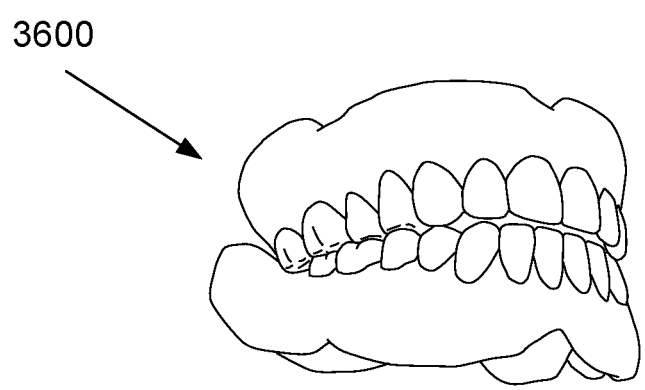
FIG. 36 illustrates an exemplary dental prosthesis.

As shown in FIG. 2, FIG. 33, and FIG. 34, the first premolar tooth form (125), when present, defines a contour with at least an incisal 2 millimeters of a facial surface of a natural human maxillary first premolar tooth, or at least an incisal 2 millimeters of a facial surface of an artificial first premolar tooth.

As shown in FIG. 8, the first premolar tooth form (125) may include a first premolar facial surface (825) and optionally a first premolar lingual slope (829). The first premolar facial surface (825) may generally define a contour with at least the incisal 2 millimeters of the facial surface of natural or artificial first premolar tooth (see also FIG. 33 and FIG. 34).

When the first premolar facial surface (825) defines a contour with at least the incisal 2 millimeters of the facial surface of the natural or artificial first premolar tooth, the clinician and/or the patient (3505) would be able to recognize the first premolar tooth form (125) as having contour similar to a tooth, and would thus be able to determine whether its location within the mouth (3515) of the patient (3505) is acceptable. Similarly, as shown in FIG. 33 and FIG. 34, other tooth forms, such as the contralateral first premolar tooth form (129), the second premolar tooth form (126), the first molar tooth form (127), and/or other tooth form (not marked) may define a contour corresponding to a facial surface with at least an incisal 2 millimeters of a facial surface of a natural or artificial corresponding tooth.

Throughout this disclosure, the term artificial tooth indicates an artificial or prosthetic tooth made by any manufacturer for the purpose of replacing an individual's missing tooth. The artificial tooth may be, for example, a plastic denture tooth, a ceramic tooth, and the like. Thus, the term artificial premolar tooth may indicate any type of artificial premolar tooth, such as, for example 0 degree, 15 degree, 20 degree, 33 degree artificial premolar tooth made by any manufacturer.

The first premolar tooth form (125), when present, may be in a first premolar tooth position when the maxillary tray appliance (110) is fitted within the mouth (3515) of the patient (3505). And, the second premolar tooth form (126), when present, is in a second premolar tooth position when the maxillary tray appliance (110) is fitted within the mouth (3515) of the patient (3505). Since the first base portion (115) of the maxillary tray appliance (110) may be contoured to either accept the edentulous maxillary gum of the patient (3505) or impression material to be applied to the edentulous maxillary gum of the patient (3505), the position of the first premolar tooth form (125) and second premolar tooth form (126) may be a factor of intended use. Since different impression materials have different suitable thicknesses, the suitable thickness of the impression material may be factored in to positioning the first premolar tooth form (125) and/or the second premolar tooth form (126), respectively.

For example, if the maxillary tray appliance (110) is to be custom manufactured for use with high viscosity impression material, the first premolar tooth form (125) would be positioned lower than if the maxillary tray appliance (110) is to be custom manufactured for use without impression material (i.e. directly contacting the edentulous maxillary gum).

As shown in FIG. 33 and FIG. 34, when the central incisor tooth form (124) is present, the central incisor tooth form (124) may generally define a contour with at least a facial surface with at least an incisal 2 millimeters of a facial surface of a natural or artificial central incisor tooth. When the central incisor tooth form (124) is present, it may define a central incisor incisal end (224).

The term "generally define", as used throughout this description indicates the possible addition of additional features, for example, the first premolar facial surface (825) may include additional grooves, extensions, markings, and the like. For example, a groove may be included in the first premolar facial surface (825) to illustrate a tooth form plane, such that the groove can be visualized from outside the mouth (3515) and allow the clinician to align the groove to the face of the patient (3505) during use.

As shown in FIG. 8, the first premolar lingual slope (829) is not particularly limited. In one aspect, the first premolar lingual slope (829) may generally define a contour with at least an incisal 2 millimeters of a lingual slope of the natural or artificial first premolar tooth. In another aspect, the first premolar lingual slope (829) may not include tooth morphology such as grooves and/or fissures. In yet another aspect, the first premolar lingual slope (829) may be non-anatomical, for example, it may be substantially vertical (for example, between 80 degrees and 100 degrees) from the horizontal plane, or, for example, it may be substantially horizontal (for example, within 10 degrees from the horizontal plane).

Other tooth form(s), such as the contralateral first premolar tooth form (129), the second premolar tooth form (126), the first molar tooth form (127), and the like may each include their own corresponding facial surface and/or lingual slope, respectively, and may take configurations as described for the first premolar facial surface (825) and the first premolar lingual slope (829), respectively.

For example, when making the prosthesis, such as the set of dentures (3600), for the patient (3505), it is advantageous to enable the clinician and/or the patient (3505) to be able to visualize most teeth which will be replaced. The first premolar tooth form (125) being in a lateral aspect (that is, being off-center) of the smile of the patient (3505), enables the clinician and the patient (3505) to see if posterior teeth are in an acceptable location in the mouth (3515), and, for example, will allow for confirmation of tooth location and/or subsequent adjustment. It is a problem in the field of dentistry that dental prostheses often need to be remade because of unacceptable positioning of teeth (such as denture teeth in the set of dentures (3600)).

In one aspect, the first base portion (115) may include a first buccal portion (530) with slope of at least 10 degrees (815) from the buccal side (513) (see FIG. 5 and FIG. 8) of the first U-shaped portion (510). The first buccal portion (530) serves to provide additional area for accepting either the edentulous maxillary gum of the patient (3505) or impression material to be applied to the edentulous maxillary gum of the patient (3505). In another aspect, the first buccal portion (530) may not be included (not shown).

Figure 6:
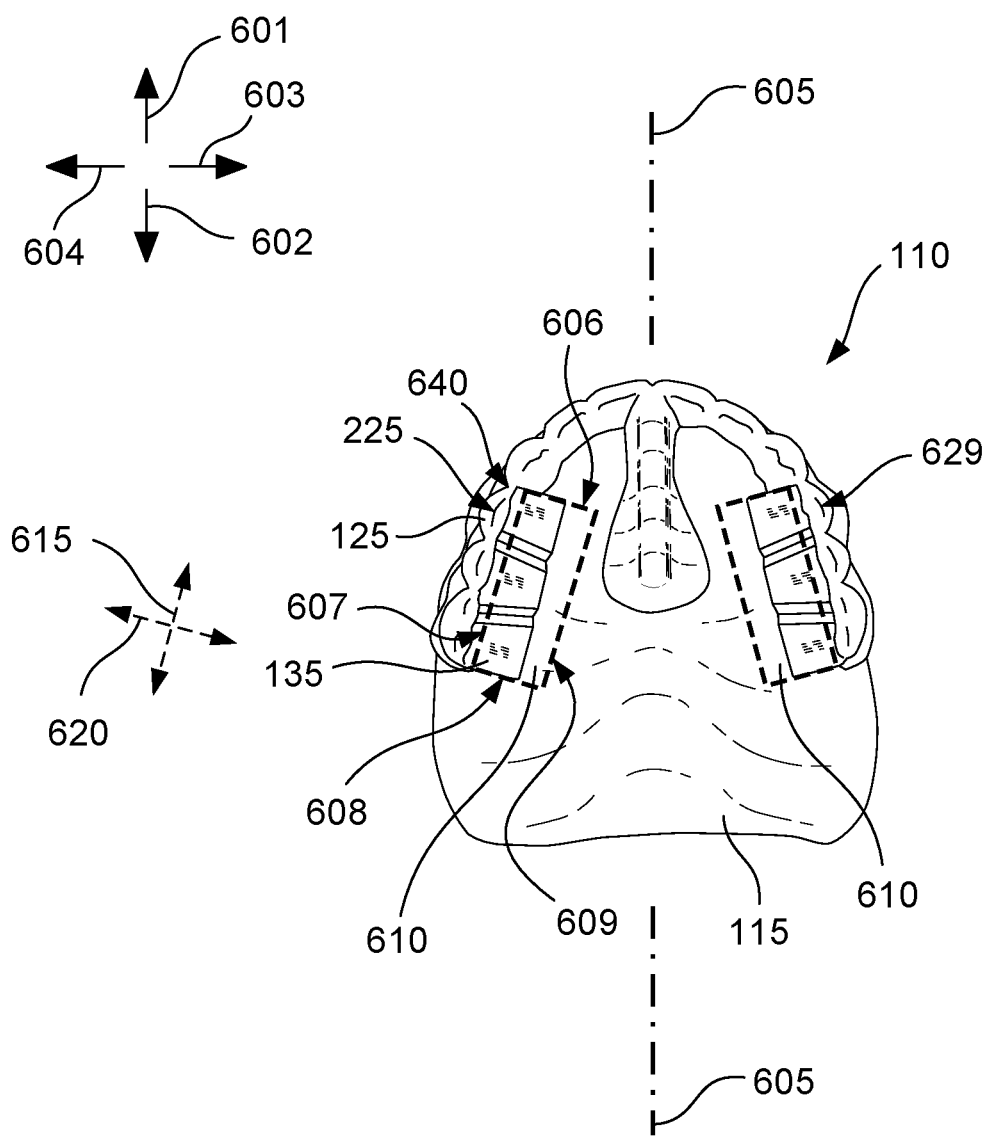
FIG. 6 is a bottom perspective view of the maxillary tray appliance of FIG. 1.
Figure 39:
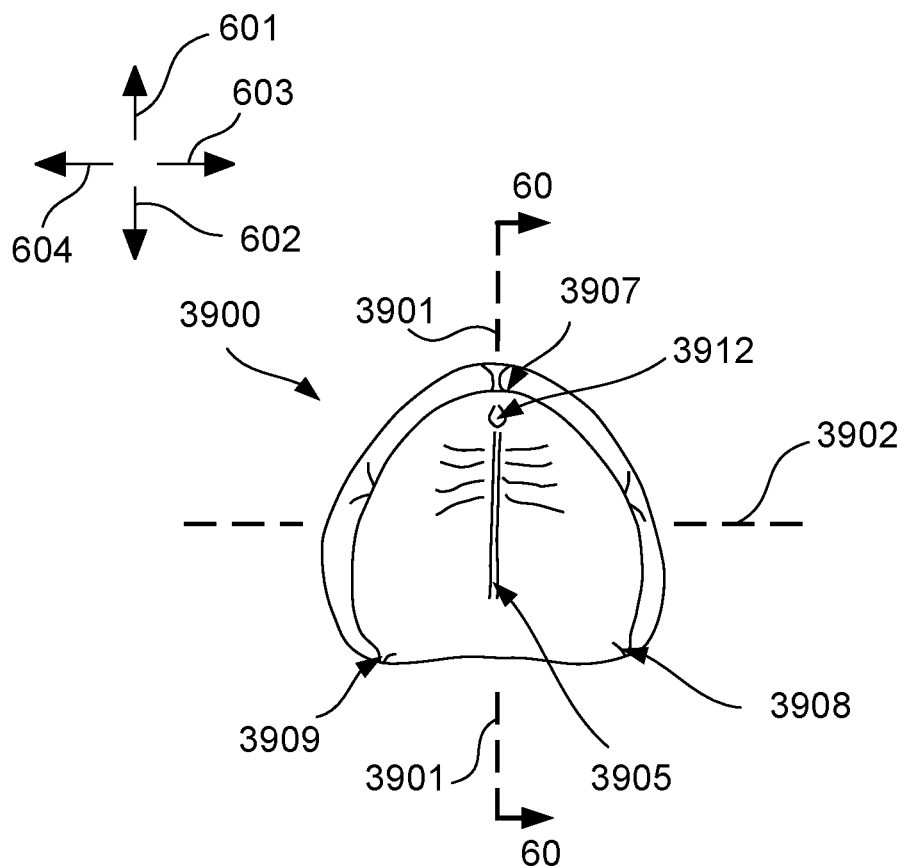
FIG. 39 is a bottom view of a first virtual model.
Figure 40:
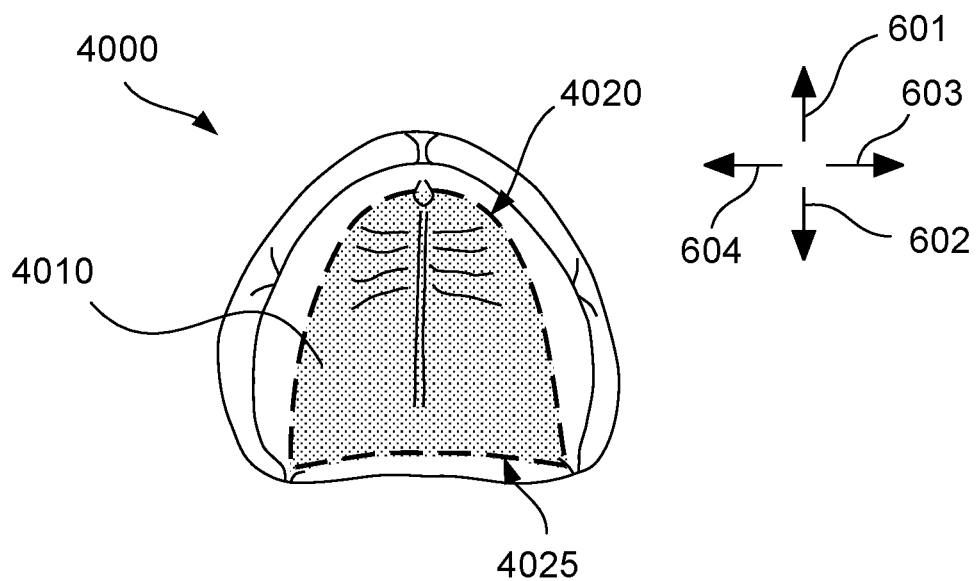
FIG. 40 is a bottom view of a second virtual model.
Figure 41:
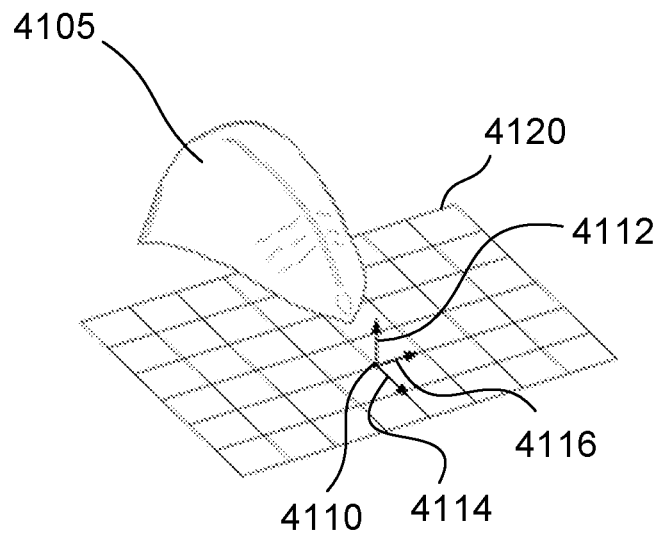
FIG. 41 is a top right perspective view of a virtual maxillary palatal form.
Figure 43A:
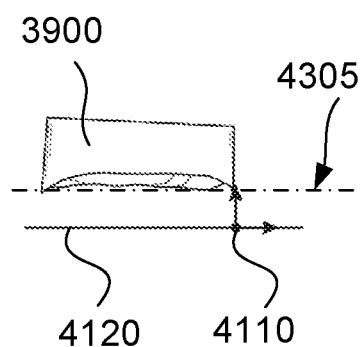
FIG. 43A is a right side perspective view of the first virtual model of FIG. 42.

Some directions referred to herein are illustrated in FIG. 6, FIG. 39, and FIG. 40, where the anterior direction (601), the posterior direction (602), the patient's left side (603), and the patient's right side (604) are indicated in the context of the bottom view of the maxillary tray appliance (110). As illustrated in FIG. 6 is an example of the premolar bucco-lingual axis (620) and the premolar mesio-distal axis (615) on the patient's right side (604) is shown. Normally, the premolar bucco-lingual axis (620) is 90 degrees from the premolar mesio-distal axis (615) in bottom view.

As shown in FIG. 6, the maxillary tray appliance (110) includes a sagittal midline (605). The premolar mesio-distal axis (615) is typically about 10 degrees to 20 degrees from the sagittal midline (605) in bottom view. The premolar mesio-distal axis (615) is determined by the morphology of the first premolar tooth form (125). Of course, the contralateral first premolar tooth form (129) defines a contralateral premolar mesio-distal axis (not marked) and a contralateral premolar bucco-lingual axis (not marked).

There are two standard numbering systems for teeth: the Universal Numbering System and the ISO numbering system. Throughout the disclosure herein, the term "first premolar tooth" designates tooth #5 or tooth #12, in the Universal Numbering System. Throughout this disclosure, the term "first premolar tooth" designates tooth #14 or tooth #24, in the ISO numbering system.

In FIG. 3, FIG. 4, FIG. 8, FIG. 33, FIG. 34, and FIG. 42, direction arrows indicate a maxillary apical direction (332) and a maxillary incisal direction (334), respectively.

As shown in FIG. 6, the contralateral first premolar tooth form (129) may define a contralateral first premolar cusp tip (629).

Figure 3:
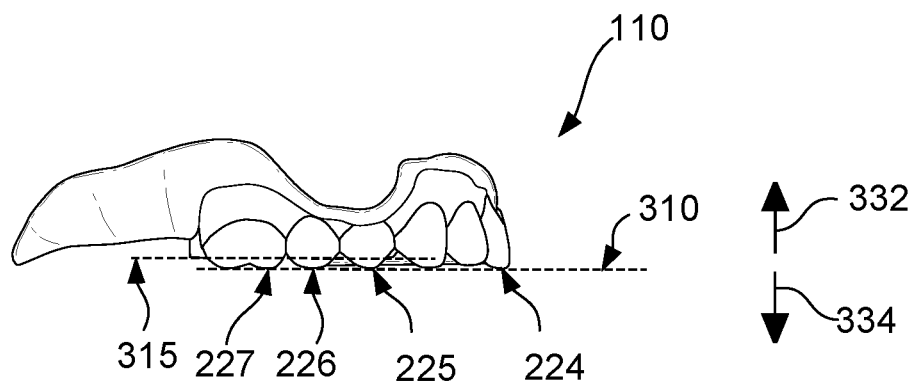
FIG. 3 is the right side perspective view of FIG. 2 showing incisal plane and first bite portion lower end.

As shown in FIG. 3, the first premolar cusp tip (225), the central incisor incisal end (224), and the contralateral first premolar cusp tip (629) (see FIG. 6) define an incisal plane (310).

Additionally, in regard to layouts as exemplified in FIG. 3, it is preferable, but not essential, that the first premolar cusp tip (225), the second premolar cusp tip (226), the first molar cusp tip (227) are generally coplanar with respect to the incisal plane (310). The term "generally coplanar", as used herein indicates an offset of no more than 2 millimeters from the incisal plane (310). This configuration advantageously serves to give the tooth forms a natural appearance. Additionally, this configuration enables the maxillary tray appliance (110) to be placed against a flat surface and not be prone to tipping. For example, following an impression taking procedure, the maxillary tray appliance (110) may be placed against a mounting table for a dental articulator (not shown), with the maxillary tray appliance (110) being placed on the mounting table with stability.

No Lingual Cusp

Figure 9:
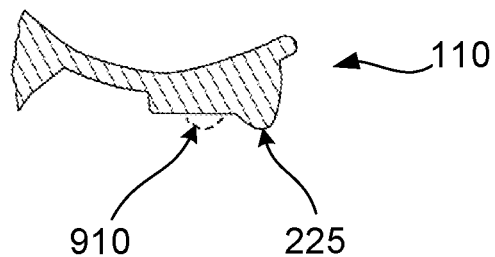
FIG. 9 is the cross-sectional view of FIG. 8 showing hypothetical location of lingual cusp of first premolar tooth form.

It is preferred but not essential that the first premolar tooth form (125) has no lingual cusp. In some embodiments, the contralateral first premolar tooth form (129), may additionally have no lingual cusp. As shown in FIG. 9, a hypothetical lingual cusp (910) is marked in FIG. 9 with a dashed line to indicate its hypothetical position had it been present. The absence of the lingual cusp incorporates the appearance of teeth in anatomically suitable locations in frontal view (see FIG. 33), such that the clinician and/or the patient (3505) can evaluate what teeth would look like in the mouth (3515) while being able to perform the jaw registration procedure at the same time.

First Contacting Portion

The first contacting portion (120), when present, may be one of an anterior-posterior ridge type first contacting portion (121), a plate type (2420) contacting portion, a pin type (2520) contacting portion, or a transverse ridge type first contacting portion (2920), which is essentially a horizontal ridge type contacting portion. As will be described later, these types of first contacting portion (120) each serve as a jaw alignment component that can accommodate a variety of configurations of natural jaw positions while adding stability to aid in occlusal registration.

First Area

As described previously, the first premolar tooth form (125) defines the premolar bucco-lingual axis (620) and the premolar mesio-distal axis (615) in bottom view, as illustrated in FIG. 6. The first premolar tooth form (125) additionally defines a first premolar mesial end (640).

The maxillary tray appliance (110) is contoured to accept a bite registration material when the patient (3505) bites down to enable the dental prosthesis to be made therewith. The bite registration material (or simply "bite material") is well known in the art for use in the jaw registration procedure. The bite registration material is used to make rigid bite impressions and capture an accurate representation of the jaw relationship of the patient (3505). Any bite registration material may be used in combination with any of the various embodiments. Exemplary known bite registration materials include a silicone material, a polyether material, a polysulfide material, a light cured material, a wax, dental compound, and/or a self-cured material and/or any combinations thereof and the like.

The maxillary tray appliance (110) optionally defines a first area (610) for accepting the bite registration material surrounded by a first buccal boundary (607), a first mesial boundary (606), a first lingual boundary (609), and a first distal boundary (608). In FIG. 6, the first buccal boundary (607), the first mesial boundary (606), the first lingual boundary (609), and the first distal boundary (608) are each marked with thick dashed lines, respectively.

The first area (610) is essentially an area that is: (a) on a generally lateral aspect of the maxillary tray appliance (110), (b) in a generally middle portion anterior-posteriorly. This area is important because it is: (a) sufficiently away from the tongue; (b) accessible to a bite registration material dispensing device; and (c) sufficiently away from the cheek.

The first buccal boundary (607) is parallel to the premolar mesio-distal axis (615) in bottom view, as shown in FIG. 6, and is 3 millimeters lingual to the first premolar cusp tip (225).

The first mesial boundary (606) is parallel to the premolar bucco-lingual axis (620) in bottom view as shown in FIG. 6. The first mesial boundary (606) is collinear with the first premolar mesial end (640). The first lingual boundary (609) is 10 millimeters lingual to the first buccal boundary (607) and is parallel to the first buccal boundary (607). The first distal boundary (608) is 20 millimeters distal to the first mesial boundary (606) and parallel to the first mesial boundary (606). These millimeter dimensions are defined so that anything outside of the "first area" is not to be considered the first bite material accepting portion (135).

It has been determined that the first area (610) being in a centralized location anterior-posteriorly, being accessible to an impression material dispenser, and being away from the tongue, would allow the bite registration material to be placed and allowed to set without being disturbed is an ideal location for placement of the bite registration material for the purpose of bite registration. Of course, the bite registration material may be placed beyond the boundaries of the first area (610), such as anteriorly to or posteriorly to the first area (610), and would thus allow for additional stability of the maxillary tray appliance (110) during the jaw registration procedure.

It is a known problem that most bite registration materials used in dentistry have polymerization shrinkage properties. Polymerization shrinkage of the bite registration material would lead to inaccuracy in the jaw registration procedure. Therefore, it would be advantageous to reduce the overall thickness in a vertical direction of the bite registration material to be used within the first area (610). Additionally, it is a known problem that bite registration materials are prone to slipping off of dental trays. Therefore, it would be advantageous to provide elements which have anti-slip properties within the first area (610). Yet additionally, the bite registration material may be prone to breaking, such as, for example, if the bite material is too thin after being set, and/or if there are voids in the bite material, the bite registration material may be prone to breaking, leading to inaccuracy to the jaw registration procedure. Various features of the various embodiments and/or aspects described herein may advantageously contribute to decreasing the amount of polymerization shrinkage, decreasing slippage of the bite registration material, and/or reducing likelihood of the bite registration material breaking.

Bite Material Accepting Portion

In some embodiments, the maxillary tray appliance (110) may include the first bite material accepting portion (135). When the first bite material accepting portion (135) is present, at least a portion of the first bite material accepting portion (135) is disposed within the first area (610) (see FIG. 6).

Figure 10:
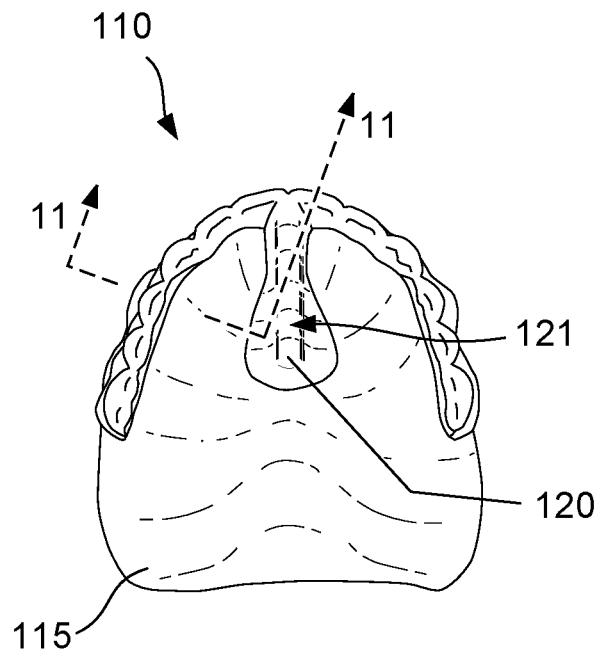
FIG. 10 is a bottom perspective view of an embodiment of the maxillary tray appliance with no first bite material accepting portion according to the embodiment of FIG. 6.
Figure 11:
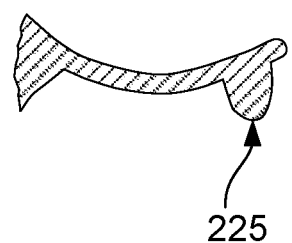
FIG. 11 is a cross-sectional view through section 11-11 of FIG. 10.

As shown in FIG. 10 and FIG. 11, in some embodiments, the first bite material accepting portion (135) may not be included in the maxillary tray appliance (110). This embodiment may be especially advantageous if, for example, the patient (3505) has a large maxillary tuberosity. When the patient (3505) has a large maxillary tuberosity relative to the norm, the amount of vertical space available for bite registration would be limited, and thus may not allow for the first bite material accepting portion (135) to downwardly extend from the first base portion (115). Additionally, if a high viscosity impression material (such as alginate or heavy body silicone impression material) were to be used for impression taking (e.g., placed on the first top surface (550)), there would also be little vertical room for bite registration material. The embodiment shown in FIG. 10 and FIG. 11 may advantageously allow the clinician and/or the patient (3505) to visualize tooth forms in the mouth (3515) of the patient (3505), while allowing for sufficient room for bite registration material to be applied to the first area (610).

As shown in FIG. 1, the first bite material accepting portion (135) may include a first bottom surface (136). In some embodiments, at least a portion of the first bottom surface (136) may be flat. Such a configuration advantageously serves to support the bite registration material, and may prevent inaccuracies due to polymerization shrinkage of the bite registration material and/or the bite registration material breaking (e.g. reducing amount of voids in the bite registration material).

Additionally, as shown in FIG. 1 and FIG. 3, in some embodiments, when the first bottom surface (136) is flat, the first bottom surface (136) may optionally be substantially parallel (that is, within 10 degrees in side view) to the incisal plane (310). This configuration may advantageously serve to provide a flat surface that is perpendicular to the direction of masticatory forces, which, in turn, prevents slipping and/or dislodgement of the bite registration material during the jaw registration procedure. Additionally and/or alternatively, the first bottom surface (136) being substantially parallel to the incisal plane (310) may advantageously serve to hide the first bite material accepting portion (135) from view, such as shown in FIG. 2 and FIG. 3, such that the clinician and/or the patient (3505) can visualize the first premolar tooth form (125), the second premolar tooth form (126) and/or the first molar tooth form (127).

It will be understood that the first bottom surface (136) is not limited to being substantially flat, and may take any suitable form, such as multiplanar, cylindrical, multilobular, and the like.

As shown in FIG. 1, the first bite material accepting portion (135) may optionally include an anti-slip element (137). The anti-slip element (137) may be defined by the first bite material accepting portion (135) (see FIG. 1), and/or may be defined by the first base portion (115) (not shown). As shown in FIG. 1, the anti-slip element (137) may be in the form of a small channel, a small indentation, a small protrusion, and the like. The anti-slip element (137) serves to prevent the bite registration material from slipping off of the first bite material accepting portion (135). As shown in FIG. 1 and FIG. 2, in some embodiments, when the anti-slip element (137) is in the form of a small channel as shown, the anti-slip element may be disposed between two tooth forms, such as the first premolar tooth form (125) and the second premolar tooth form (126), such that the first bite material accepting portion (135) cannot be visualized in a side view (see FIG. 2). In the context of the anti-slip element, the term small indicates a vertical height of less than 5 millimeters.

Figure 12:
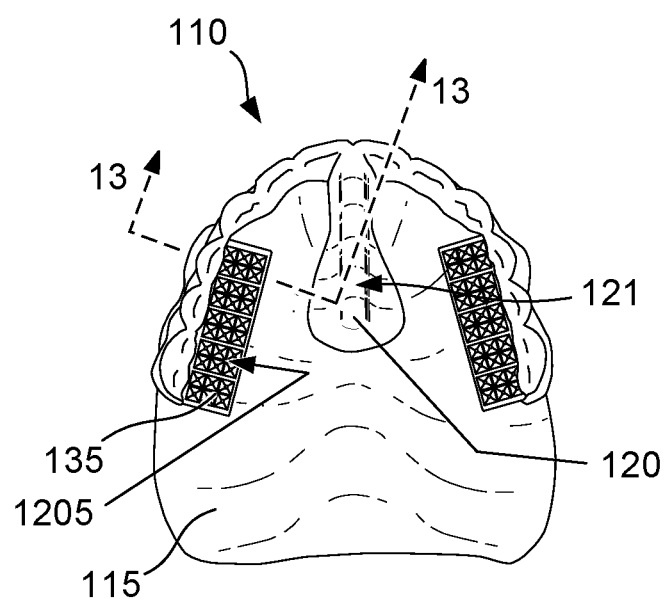
FIG. 12 is a bottom perspective view of an embodiment of the maxillary tray appliance with multifaced form first bite material accepting portion according to the embodiment of FIG. 6.
Figure 13:
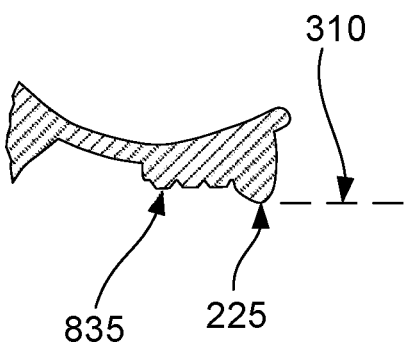
FIG. 13 is a cross-sectional view through section 13-13 of FIG. 12.

In some embodiments, as shown in FIG. 7 and FIG. 12, the first bite material accepting portion (135) may be in direct contact with at least one of the tooth form(s) (e.g. the first premolar tooth form (125)), such that there is increased strength to prevent breakage of the maxillary tray appliance (110). In some embodiments, as shown in FIG. 14 and FIG. 15, the first bite material accepting portion (135) and the tooth form(s) (e.g. the first premolar tooth form (125)) may not be in contact, such that bite registration material is prevented from slipping off of the first bite material accepting portion (135).

As described previously, the first top surface (550) may be contoured to accept the edentulous maxillary gum of the patient (3505) or accept impression material to be applied to the edentulous maxillary gum of the patient (3505).

When the first top surface (550) is used to accept impression material, the maxillary tray appliance (110) may be utilized for an impression taking and jaw registration procedure including the steps of: (1) applying impression material to the first top surface (550); (2) pressing the maxillary tray appliance (110) against the edentulous maxillary gum of the patient (3505); (3) applying the bite registration material to the first area (610); (4) instructing the patient (3505) to bite down such that the bite registration material is deformed; (5) setting the bite registration material.

The impression taking and jaw registration procedure has several advantages over prior art methods, including: (1) less overall time needed for fabricating a dental prosthesis; (2) since the impression material had been placed on the first top surface (550) and pressed against the edentulous maxillary gum of the patient (3505), the maxillary tray appliance (110) will be very stable, and will not dislodge from the edentulous maxillary gum of the patient (3505), leading to a more accurate jaw registration procedure.

The mandibular tray appliance (1610) may include a second contacting portion (1620). The second contacting portion (1620) provides a contacting surface or landing surface for the first contacting portion (120) when the tray appliance system is fitted within the mouth (3515) of the patient (3505).

When the first top surface (550) is used to accept impression material, the clinician may, for example, press down on the maxillary tray appliance (110) with more force on one side of the maxillary tray appliance (110) than the other side when the impression material is setting. This may cause the maxillary tray appliance (110) to be rotationally misaligned to the maxilla, that is, one side of the maxillary tray appliance (110) may be lower than the other side of the maxillary tray appliance (110). This misalignment may cause a lateral aspect of the maxillary tray appliance (110) and a lateral aspect of the mandibular tray appliance (1610) to contact each other, instead of the first contacting portion (120) and the second contacting portion (1620) making contact. If the lateral aspect of the maxillary tray appliance (110) and the lateral aspect of the mandibular tray appliance (1610) were to make contact, the maxillary tray appliance (110) and/or the mandibular tray appliance (1610) may be dislodged, that is, separate from contact with the edentulous gum of the patient (3505). This may result in the jaw registration procedure being inaccurate, and may lead to subsequent fabrication of a dental prosthesis that does not have accurate occlusion.

FIG. 10 and FIG. 11 illustrates one embodiment in which the maxillary tray appliance (110) does not include the first bite material accepting portion (135). This embodiment may be especially advantageous for use in a patient who does not have much vertical space for the bite registration material, for example, for a patient who has a large maxillary tuberosity.

As shown in FIG. 1, FIG. 2, and FIG. 3, in some embodiments, the first bite material accepting portion (135) extends downwardly no further than the incisal plane (310). In FIG. 3, a first bite portion lower end (315) is marked in dashed line. The first bite portion lower end (315) represents a vertical level of a lowest point of the first bite material accepting portion (135) relative to the incisal plane (310). This configuration advantageously allows for rotational and/or translational freedom while reducing the amount of vertical height of the bite registration material (see FIG. 20 and FIG. 21). Additionally, this configuration advantageously allows for the tooth forms (such as the first premolar tooth form (125)) to be trimmed (e.g. ground down) while allowing the bite registration material to be completely seated. For example, if the maxillary tray appliance (110) was skewed to one side during impression taking, such as the left side being lower than the right side, then the left side tooth forms may be trimmed off prior to setting the maxillary tray appliance (110) on to the dental articulator.

As shown in FIG. 3, in some embodiments, the first bite material accepting portion (135) may extend downwardly no further than 1 millimeter to 5 millimeters to the incisal plane. Since, as previously described, most bite registration materials used in dentistry undergo polymerization shrinkage, this configuration further advantageously allows for rotational freedom and/or translational freedom while reducing the amount of vertical height of the bite registration material. Additionally, this configuration allows for negative space between the tooth forms (such as the first premolar tooth form (125), second premolar tooth form (126), first molar tooth form (127), central incisor tooth form (124)) to be seen. The presence of this negative space, known in the art as "embrasure" around tooth forms is desirable for the tooth forms to appear natural.

Figure 4:
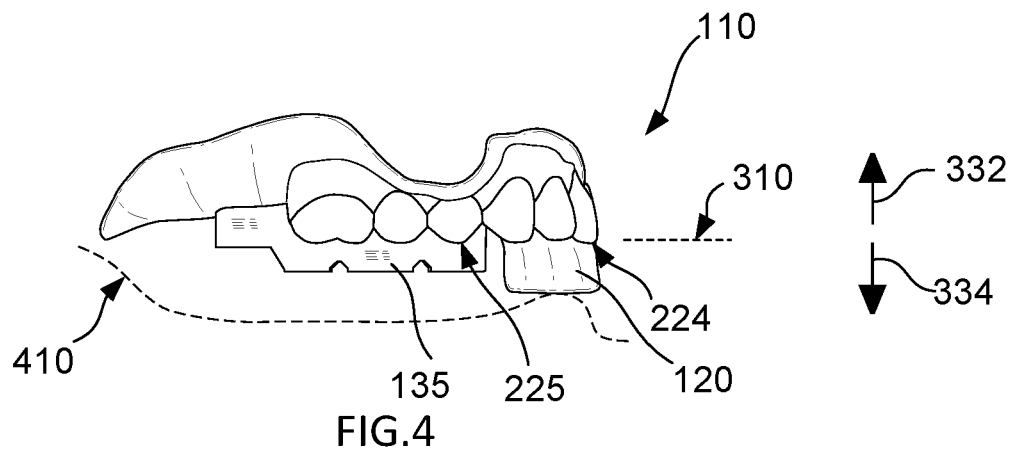
FIG. 4 is a right side perspective view of an embodiment of the maxillary tray appliance with first bite material accepting portion extending downwardly past the incisal plane according to the embodiment of FIG. 2.

Referring to FIG. 4, in some embodiments, the first bite material accepting portion (135) may extend downwardly past the incisal plane (310), preferably no further than 30 millimeters past the incisal plane (310). This configuration may, for example, be used when the patient (3505) is completely edentulous, and no mandibular tray appliance (1610) is to be used. As shown in FIG. 4, in this situation, the first contacting portion (120) may extend downwardly beyond the central incisor incisal end (224), and make contact with the patient's edentulous mandibular gum (410). In FIG. 4, the patient's edentulous mandibular gum (410) is marked with a dashed line. If the bite material accepting portion extends downwardly more than 30 millimeters past the incisal plane (310), then the patient's occlusal vertical dimension will be too tall.

Block Like Form

When viewed in bottom view, the first bite material accepting portion (135) may take a contour including, but not limited to: a block-like form (705), a multifaced form (1205), and/or a cylindrical form (1505). The block-like form (705), the multifaced form (1205), and/or the cylindrical form (1505) may each advantageously serve, for example, to provide suitable amount of vertical room for the bite registration material, prevent dislodgement of the bite registration material, and/or provide room for the tongue. Providing room for the tongue serves to prevent dislodgement.

As shown in FIG. 14, optionally, the first bite material accepting portion (135) may take, at least in part, a V shaped form (1405) in a bottom view. The V shaped form (1405) advantageously serves to prevent the bite registration material from being dislodged laterally and/or slipping when there is little vertical space for the bite registration material. This is especially advantageous for patients who have large maxillary tuberosities.

Second Base Portion

The tray appliance system optionally includes the mandibular tray appliance (1610). The mandibular tray appliance (1610) includes a second base portion (1615).

The mandibular tray appliance (1610) is useful when the patient is completely edentulous, that is, completely without teeth in both the maxilla and mandible. When the patient is completely edentulous, the second base portion (1615) may have a predetermined shape contoured to accept either: (1) the edentulous mandibular gum (410) of the patient, or (2) impression material to be applied to the patient's edentulous mandible.

Specifically, the second base portion (1615) includes the second bottom surface (1750). The second bottom surface (1750) may be contoured to accept the patient's edentulous mandible or accept impression material to be applied to the patient's edentulous mandible.

The second base portion (1615) includes a second U-shaped portion (1810). The second U-shaped portion (1810) is shown as shaded in FIG. 18 and FIG. 19. The second U-shaped portion (1810) is substantially U shaped in bottom view. As described previously, the term "substantially U shaped" indicates a shape that is either a continuous or discontinuous U shape. Thus, in this instance the second U-shaped portion (1810) would be substantially U shaped if, in some embodiments, there are one or more apertures defined by the second base portion (1615) (not shown). Therefore, the U shape of the second U-shaped portion (1810) may be broken.

Figure 18:
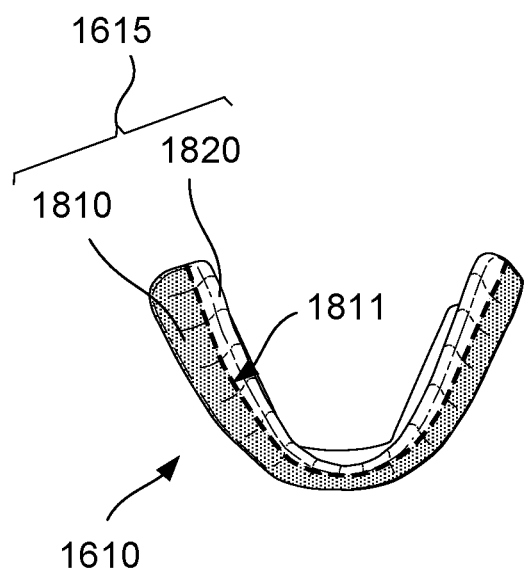
FIG. 18 is the bottom perspective view of the mandibular tray appliance of FIG. 17 showing location of second U-shaped portion.

Optionally, the second U-shaped portion (1810) may include a second lingual side (1811), marked with thick dashed line in FIG. 18. The second base portion (1615) may optionally include a second lingual portion (1820) extending downwardly with slope of at least 10 degrees from the second lingual side (1811) of the second U-shaped portion (1810), see also FIG. 23.

Figure 19:
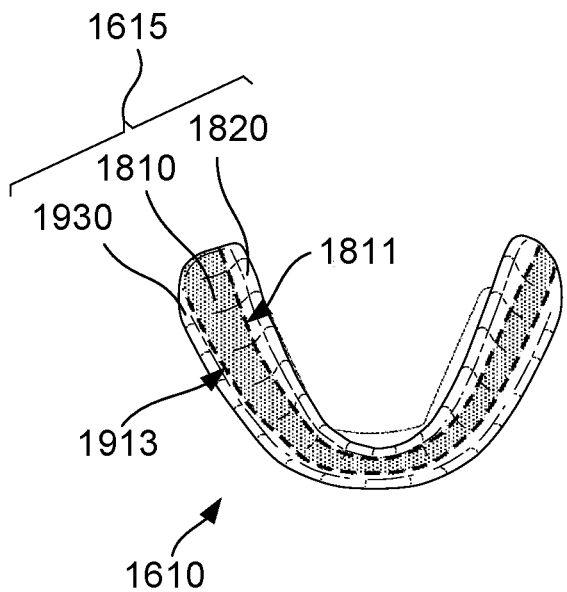
FIG. 19 is a bottom perspective view of an embodiment of the mandibular tray appliance with second buccal portion according to the embodiment of FIG. 18.

As shown in FIG. 19, the second U-shaped portion (1810) may further optionally include a second buccal side (1913), marked with thick dashed line in FIG. 19. The second base portion (1615) may further optionally include a second buccal portion (1930) extending downwardly with slope of at least 10 degrees from the second buccal side (1913) of the second U-shaped portion (1810).

As described previously, the first contacting portion (120), when present, is contoured to make contact with a contacting surface originating from the mandibular jaw (3520) of the patient (3505). The contacting surface may be a portion of either: (1) the mandibular tray appliance (1610), or (2) the mandibular anterior tooth, or (3) the mandibular gum (410). The first contacting portion (120) may take one of several types or forms.

FIG. 1 shows the anterior-posterior ridge type first contacting portion (121), which is preferably anterior-posteriorly elongate in form. That is, the anterior-posterior ridge type first contacting portion (121) is longer in an anterior-posterior direction than it is wide in a transverse direction along a bottom 2 millimeter surface. Preferably, the anterior-posterior ridge type first contacting portion (121) is configured with a contacting surface having an anterior-posterior length that is at least twice as long as a transverse width. This is described in further detail in co-pending PCT application PCT/US18/22243, which is incorporated herein in its entirety.

Since the purpose of the first contacting portion (120) is to contact the surface originating from the mandibular jaw, the elongate form of the anterior-posterior ridge type first contacting portion (121) advantageously may serve to accommodate a variety of jaw configurations, such as orthognathic, prognathic, or retrognathic jaw configurations. Additionally, and/or alternatively, the elongate form of the anterior-posterior ridge type first contacting portion (121) may serve to direct vector forces during contact to be substantially centered (that is, not too far off to the left side or right side), thus preventing tipping of the tray and/or off-center biting by the patient (3505).

As described previously, the mandibular tray appliance (1610) may include the second contacting portion (1620). The second contacting portion (1620) provides a contacting surface or landing surface for the first contacting portion (120) when the tray appliance system is fitted within the mouth (3515) of the patient (3505). That is, when the maxillary tray appliance (110) and the mandibular tray appliance (1610) are fitted in the mouth of the patient (3505), the first contacting portion (120) and the second contacting portion (1620) make contact when the patient (3505) bites down.

The mandibular tray appliance (1610) may further include a second bite material accepting portion (1635), which is intended to accept the bite registration material when the patient (3505) bites down to enable the dental prosthesis to be made therewith. That is, for example, the tray appliance system, with the addition of the bite registration material may enable the dental prosthesis to be made using any method known in the art, such as with use of the dental articulator, or using any computer aided design/computer aided manufacturing (CAD/CAM) method, or combination of methods.

Figure 16A:
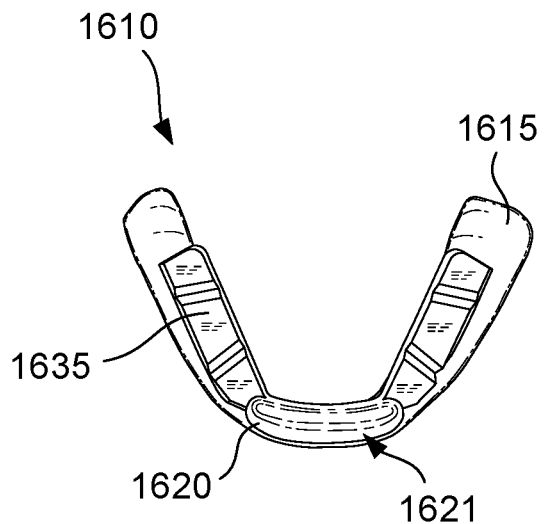
FIG. 16A is a top perspective view of a mandibular tray appliance.
Figure 16B:
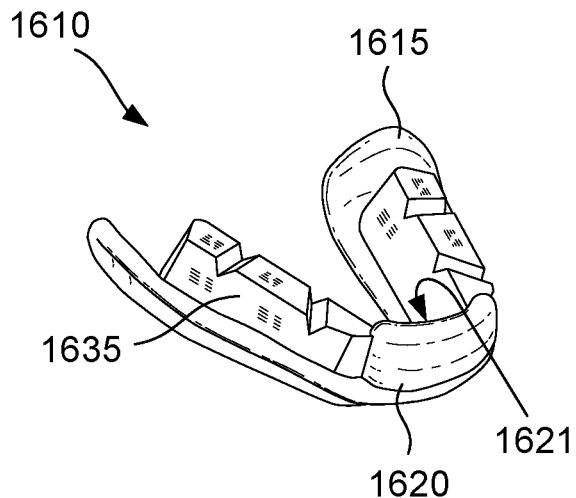
FIG. 16B is a top right perspective view of the mandibular tray appliance of FIG. 16A.
Figure 17:
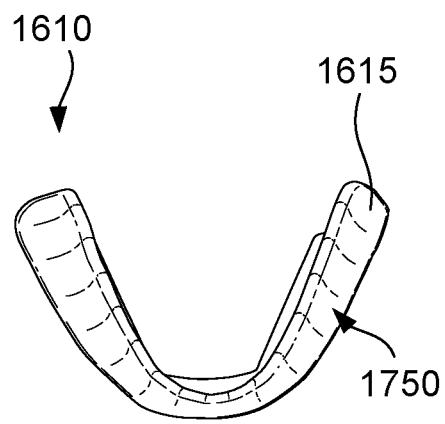
FIG. 17 is a bottom perspective view of the mandibular tray appliance of FIG. 16A.

When the first contacting portion (120) is the anterior-posterior ridge type first contacting portion (121), the second contacting portion (1620) may be a second ridge type contacting portion (1621). As shown in FIG. 16A, the second ridge type contacting portion (1621) may be either straight or arcuate in top view. This is described in further detail in co-pending PCT application PCT/US18/22243.

Figure 29:
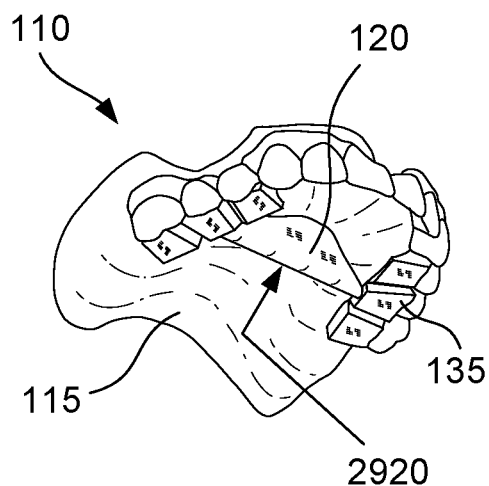
FIG. 29 is a bottom right perspective view of an embodiment of the maxillary tray appliance having transverse ridge type first contacting portion according to the embodiment of FIG. 1.
Figure 30:
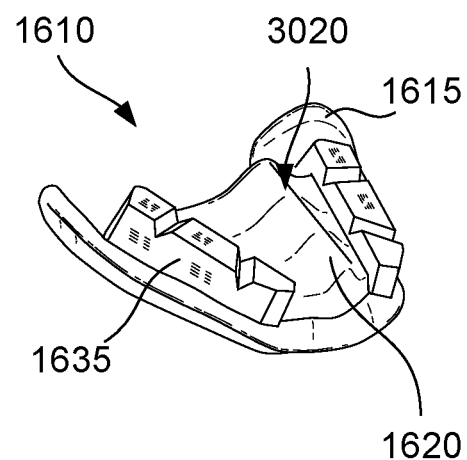
FIG. 30 is a top right perspective view of an embodiment of the mandibular tray appliance having anterior-posterior ridge type second contacting portion according to the embodiment of FIG. 16B.

Referring to FIG. 29, when the first contacting portion (120) is a transverse ridge type first contacting portion (2920), the second contacting portion (1620) is preferably an anterior-posterior ridge type (3020).

In some embodiments, the first contacting portion (120) may be the plate type (2420). That is, the first contacting portion (120) may be substantially planar, that is, having upward or downward slope of no more than 10 degrees. The plate type (2420) of the first contacting portion (120) may be utilized with the pin type (2520) second contacting portion (1620).

Figure 26:
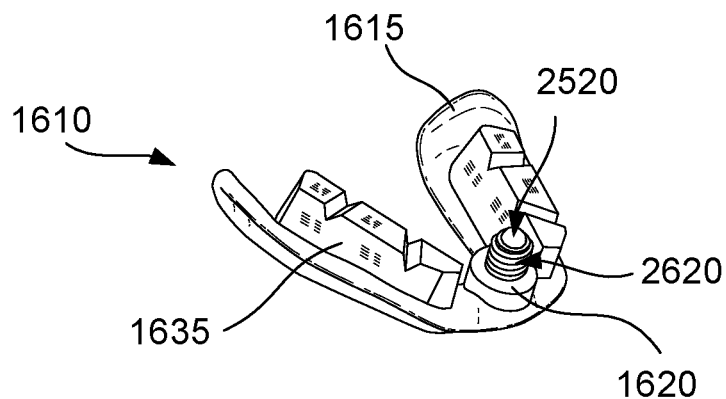
FIG. 26 is a top right perspective view of an embodiment of the mandibular tray appliance having threading according to the embodiment of FIG. 25.

As illustrated in FIG. 26, the pin type (2520) second contacting portion (1620) may additionally include a threading (2620). The threading (2620) may thus allow the pin type (2520) second contacting portion (1620) to be adjusted to extend upwardly or downwardly.

Figure 27:
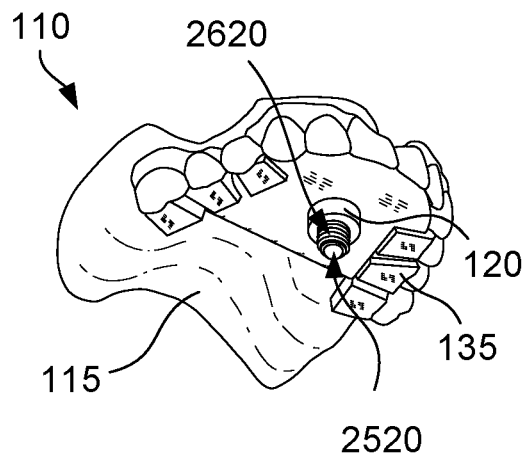
FIG. 27 is a bottom right perspective view of an embodiment of the maxillary tray appliance having pin type first contacting portion according to the embodiment of FIG. 1.
Figure 28:
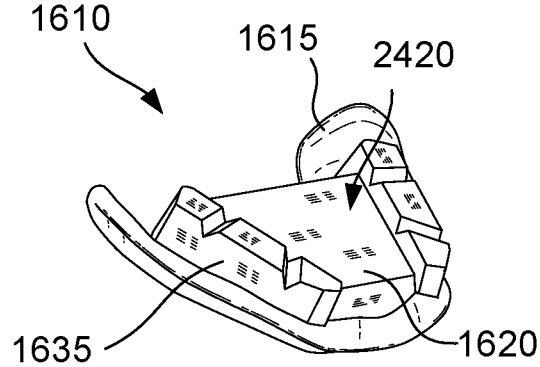
FIG. 28 is a top right perspective view of an embodiment of the mandibular tray appliance having plate type first contacting portion according to the embodiment of FIG. 16B.

As illustrated in FIG. 27, in some embodiments, the first contacting portion (120) may be the pin type (2520). The pin type (2520) first contacting portion (120) may also include the threading (2620). As shown in FIG. 28, the pin type (2520) first contacting portion (120) may be used with the plate type (2420) second contacting portion (1620).

The variety of types of first contacting portion (120) and second contacting portion (1620) are occlusal registration components and serve an important purpose in accurate bite registration.

Figure 31:
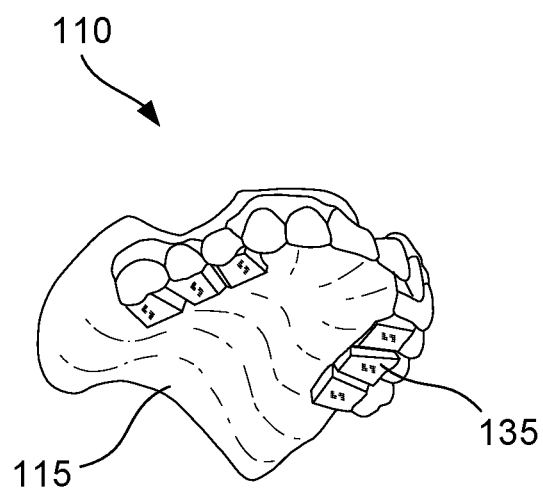
FIG. 31 is a bottom right perspective view of an embodiment of the maxillary tray appliance having no first contacting portion according to the embodiment of FIG. 1.
Figure 32:
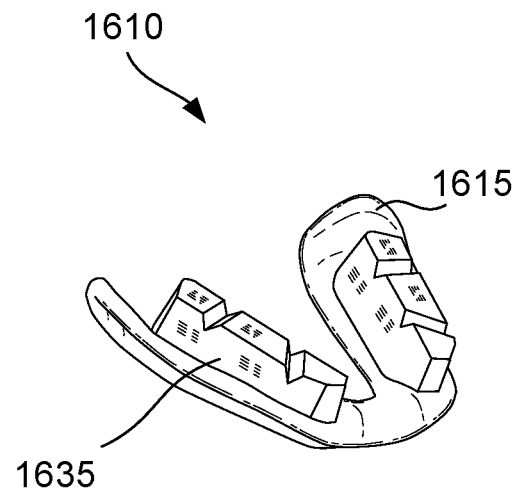
FIG. 32 is a top right perspective view of an embodiment of the mandibular tray appliance having no second contacting portion according to the embodiment of FIG. 16B.

As shown in FIG. 31, in some embodiments, the maxillary tray appliance (110) may not include a contacting portion. For example, this configuration may be used in coordination with the mandibular tray appliance (1610) which also does not include a contacting portion (see FIG. 32). In use, the maxillary tray appliance (110) as shown in FIG. 31 may be used in coordination with bite registration material having higher viscosity than light body silicone impression material, such as medium base or heavy base silicone bite registration material, alu-wax, and the like. The clinician may guide the patient (3505) into a centric relation position, and vertical dimension may be determined using, for example, a vertical dimension of rest-vertical dimension of occlusion (VDR-VDO) method.

In the field of dentistry, impression materials are classified into light body, medium body, and heavy body types.

Figure 22:
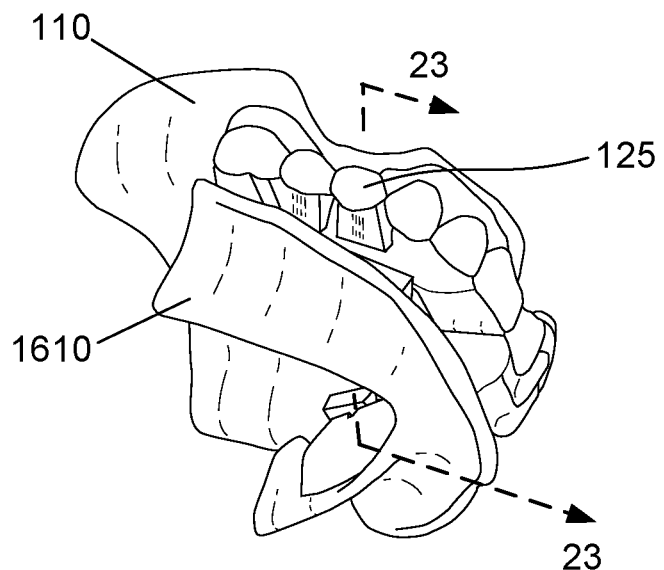
FIG. 22 is a bottom side perspective view of the tray appliance system of FIG. 20.
Figure 23:
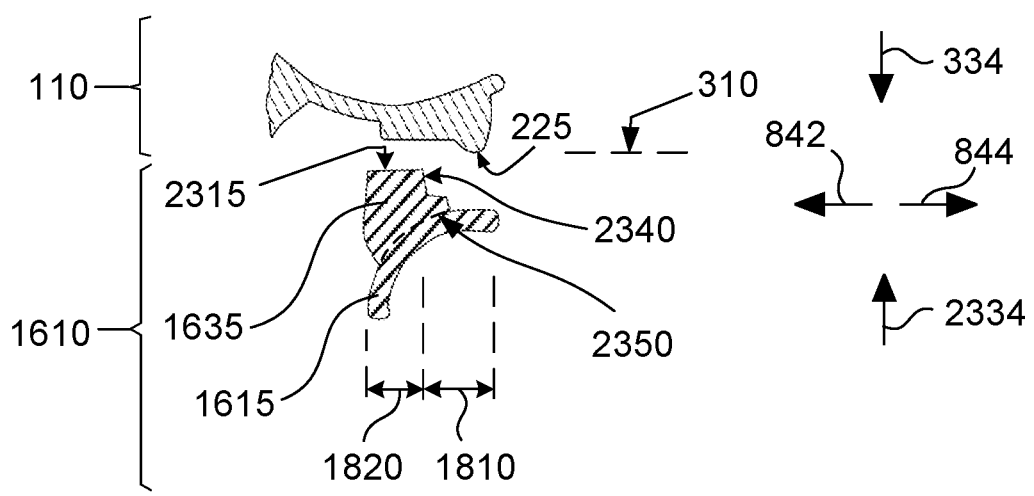
FIG. 23 is a cross-sectional view through section 23-23 of FIG. 22.
Figure 24:
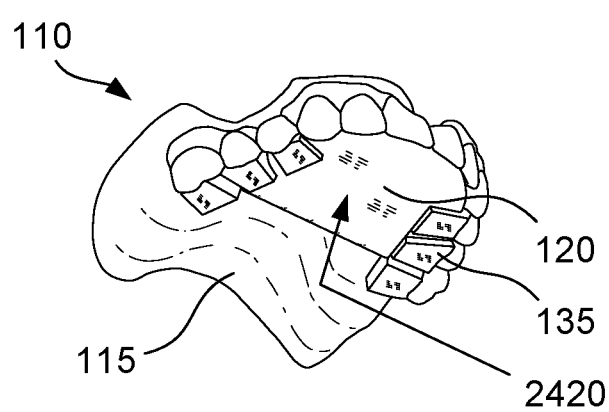
FIG. 24 is a bottom right perspective view of an embodiment of the maxillary tray appliance having plate type first contacting portion according to the embodiment of FIG. 1.
Figure 25:
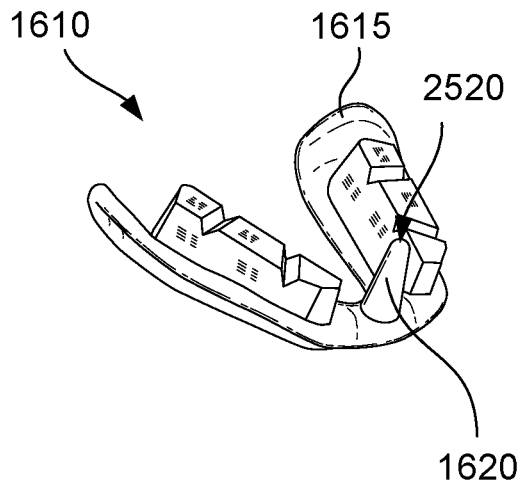
FIG. 25 is a top right perspective view of an embodiment of the mandibular tray appliance having pin type second contacting portion according to the embodiment of FIG. 16B.

FIG. 23 illustrates a cross sectional view through section line 23-23 of FIG. 22. Specifically, section line 23-23 is a cross section through the first premolar cusp tip (225) parallel to the premolar bucco-lingual axis (620). In FIG. 23, the maxillary incisal direction (334) is illustrated for the incisal direction for the maxillary tray appliance (110), and a mandibular incisal direction (2334) is illustrated for the incisal direction for the mandibular tray appliance (1610).

In FIG. 23, a second base portion boundary (2350) is marked with a dashed line. Since the mandibular tray appliance (1610) is shown in a unitary piece formation, the second base portion boundary (2350) is hypothetical because in some embodiments, it may not be a physical separation, but rather a designation to show what the portion would look like separated from its integration in the mandibular tray appliance (1610). The second base portion (1615) is preferably 0.5 millimeters to 5 millimeters in thickness.

As described previously, the mandibular tray appliance (1610) may include the second bite material accepting portion (1635), extending upwardly from the second base portion (1615). The second bite material accepting portion (1635) includes a second top surface (2315). As shown in FIG. 23, in some embodiments, the second top surface (2315) may be substantially flat, such that the bite registration material to be applied to the second top surface (2315) is prevented from developing voids, prevented from dislodgement and/or is not too thin and/or not too thick. In some embodiments, the second top surface (2315) may be between 1 millimeter and 5 millimeters lower than the incisal plane (310) when the tray appliance system is fitted within the mouth (3515) of the patient (3505). This configuration advantageously serves to provide rotational freedom, provide translational freedom, and/or prevent inaccuracies in jaw registration.

It will be understood that the second top surface (2315) is not limited to being substantially flat, and may take any suitable form, such as multiplanar, cylindrical, multilobular, and the like.

The second bite material accepting portion (1635) includes a second buccal surface (2340), defined as a surface covering a top 2 millimeters of a buccal side of the second bite material accepting portion (1635). In some embodiments, the second buccal surface (2340) may be between 2 millimeters and 10 millimeters in the lingual (842) direction to the first premolar cusp tip (225) when the tray appliance system is fitted within the mouth (3515) of the patient (3505). This configuration serves to provide rotational freedom, provide translational freedom, and/or prevent inaccuracies in jaw registration from polymerization shrinkage of the bite registration material.

Figure 20:
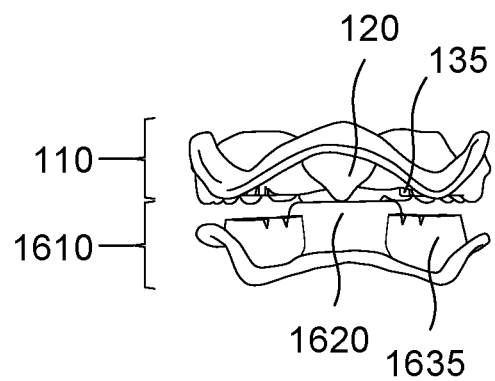
FIG. 20 is a rear perspective view of the tray appliance system including a maxillary tray appliance and a mandibular tray appliance.
Figure 21:
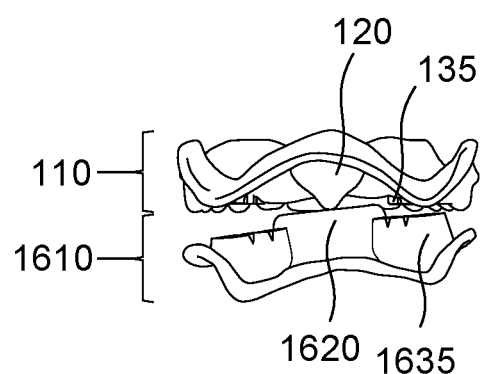
FIG. 21 is a rear perspective view of the tray appliance system of FIG. 15 showing the tray appliance system fitted to a mouth of an individual with rotational misalignment from the norm.

FIG. 20 shows the tray appliance system including the maxillary tray appliance (110) and the mandibular tray appliance (1610) in posterior view in a configuration where the maxillary tray appliance (110) and the mandibular tray appliance (1610) are ideally aligned in the mouth (3515) of a typical completely edentulous patient. FIG. 21 illustrates the tray appliance system showing rotational misalignment of the maxillary tray appliance (110) and the mandibular tray appliance (1610). This rotational misalignment may be brought about from, for example, the clinician rotationally misaligning the maxillary tray appliance (110) and/or the mandibular tray appliance in the mouth (3515) of the patient (3505). Therefore, an advantage of most embodiments is the advantage of having rotational freedom. That is, being able to be used in a variety of rotational differences from the norm (such as shown in FIG. 20 and FIG. 21). A second advantage of most embodiments is the advantage of having translational freedom (front to back and left to right). That is, being able to be used in a variety of translational differences from the norm.

Referring now to FIG. 33, in some embodiments, the first base portion (115) may optionally define a labial notch (3310) and optionally a buccal notch (3320).

The labial notch (3310) serves to provide room for impression material or border molding material to be supported by the first base portion (115) without excessively pushing on the labial frenum of the patient (3505). When the labial notch (3310) is present, the central incisor tooth form (124) may define a facial contour that does not completely follow the facial contour of the natural or artificial central incisor tooth. More specifically, in some embodiments, as shown in FIG. 33, the central incisor tooth form (124) may define a notched facial contour, such that central incisor tooth form (124) has the appearance of a central incisor, but also allows room for the labial frenum of the patient (3505). For example, in some embodiments, when fitted in the mouth, about 1 millimeter to about 5 millimeters of distance may be provided from the labial notch (3310) to the labial frenum of the patient (3505), such that impression material does not disturb the labial frenum.

The buccal notch (3320), when present, is defined by the first base portion (115), serving to provide room for the buccal frenum of the patient (3505). For example, in some embodiments, when fitted in the mouth, about 1 millimeter to about 5 millimeters of distance may be provided from the buccal notch (3320) to the buccal frenum of the patient (3505) such that impression material does not disturb the buccal frenum.

As shown in FIG. 33, the maxillary tray appliance (110) may additionally include a gum portion (3330).

Fabricating the Maxillary Tray Appliance

As described previously, in one implementation, the tray method (3800) includes the model obtaining step (3805), the model receiving step (3807), the component obtaining step (3810), the decimating step (3815), the defining step (3820), the selecting step (3825), the determining step (3830), the aligning step (3835), the relieving step (3840), the base portion generating step (3845), the modifying step (3850), the virtual tray generating step (3855), and the fabricating step (3860).

The model obtaining step (3805) is obtaining, by the digitizer (3735) a first virtual model (3900). Shown in FIG. 39, the first virtual model (3900) is a digital representation of at least a portion of the edentulous maxillary gum of the patient (3505).

As previously described, the digitizer (3735) may be any known digitizer utilizing any known digitizing method. For example, any direct method or indirect method of digitization may be utilized. For example, a preliminary impression (such as using alginate impression material) may be taken of the edentulous maxillary gum of the patient (3505). The preliminary impression may then be digitized using the digitizer (3735).

The digitizer (3735) is connected to the client computing device (3730) or the computing device (3705) by known communication means, such as, for example, universal serial bus (USB), network communication means, such as wireless communication means, an intranet, and/or the internet.

The model receiving step (3807) is receiving, by the computing device (3705) the first virtual model (3900). As shown in FIG. 37, in one aspect, the first virtual model (3900) may be obtained by the digitizer (3735), transmitted to the client computing device (3730). The client computing device (3730) may subsequently transmit the first virtual model (3900) through the network (3725). The network (3725) may be any known network, such as any wireless or wired network, such as an intranet and/or the internet. The computing device (3705) may subsequently receive the first virtual model (3900) from the network (3725). In another aspect, the digitizer (3735) may be connected to the computing device (3705). Thus, the computing device (3705) may receive the first virtual model (3900) from the digitizer (3735). In yet another aspect, the digitizer (3735) and/or the client computing device (3730) may store the first virtual model (3900) in network based storage medium, such as "the cloud". Thus the computing device (3705) may receive the first virtual model (3900) through the network based storage medium.

The component obtaining step (3810) is obtaining, from the data base (3710) at least one virtual component (4510). As discussed previously, the data base (3710) stores various virtual components in non-volatile memory. Referring to FIG. 45 to FIG. 48, the exemplary virtual component (4510) preferably includes a virtual gum surface (4505), a virtual contacting surface (4520), a virtual bite material accepting portion (4535), a plurality of virtual tooth forms, such as virtual central incisor tooth form (4524), and virtual first premolar tooth form (4525). The virtual contacting surface (4520) may take any form as previously described for the first contacting portion (120), such as anterior-posterior ridge type, transverse ridge type, plate type, pin type, and the like.

In one aspect, there may be a single virtual component (4510) stored in the data base (3710). In another aspect, there may be a plurality of virtual components (4510) stored in the data base (3710). For example, there may be several different sized and/or shaped virtual components (4510) to choose from.

Figure 58:
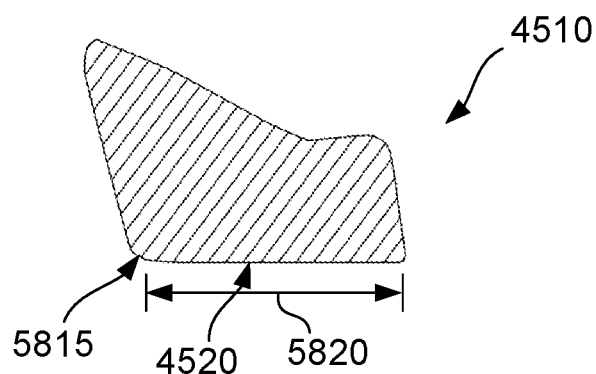
FIG. 58 is a side cross sectional view showing the virtual component through section 58-58 of FIG. 46.

Referring to FIG. 58, when the virtual contacting surface (4520) is anterior-posterior ridge type or plate type, in longitudinal cross sectional view, the virtual contacting surface (4520) is preferably substantially straight. The term "substantially straight" as used herein indicates an outline form having slope of no more than 10 degrees. Thus, a virtual bevel (5815) is not part of the virtual contacting surface (4520). The virtual contacting surface (4520) serves to provide a contacting surface for the contacting surface originating from the mandibular jaw, as described above in reference to the first contacting surface (120) as described above. The virtual contacting surface (4520) includes a virtual contacting surface length (5820), which may be preferably, no less than 10 millimeters and optionally between 15 and 60 millimeters. It is contemplated that the virtual component (4510) can be freely enlarged or shrunken, therefore, the abovementioned measurements are measured in respect to the tangible (real) maxillary tray appliance (110).

The decimating step (3815) is decimating the first virtual model (3900) to obtain a second virtual model (4000). Commercially available digitizers generally output virtual 3D files, such as .STL, .OBJ, and the like in the tune of 100,000 to 1,000,000 vertices. As known in the art, decimation is the process of reducing the number of polygons or vertices in a polygon mesh. The first virtual model (3900) may be decimated for the purpose of creating the second virtual model (4000) in the tune of about 50 to about 300 vertices, sometimes 300 to 10,000 vertices, or even 10,000 to 200,000 vertices. For example, as will be described later, the "fuzzy correspondences" method may optimally utilize polygon meshes of, for example, 128 vertices. The second virtual model (4000) may be used in subsequent step(s) to determine alignment data (to be discussed in the determining step 3830) for the first virtual model (3900).

Additionally or alternatively, the first virtual model (3900) may be decimated for the purpose of ease of calculation and/or manipulation. Thus, the first virtual model (3900) may also be decimated (reduced) to the tune of, for example, 10,000 to 200,000 polygons.

It will be understood that the decimating step (3815) is preferred but not essential. For example, use of more powerful and/or efficient computing device (3705) may allow the maxillary tray appliance (110) to be fabricated without the decimation step (3815).

The defining step (3820) is defining, by the computing device (3705), a first region of interest (4010) on a palatal portion of the second virtual model (4000) or first virtual model (3900). Herein, the first region of interest (4010) may also be referred to as first ROI. In FIG. 40, the first region of interest (4010) is shaded and outlined by a ROI anteriolateral boundary (4020) and ROI posterior boundary (4025). The ROI anterio-lateral boundary (4020) and the ROI posterior boundary (4025) are marked with dashed line, respectively.

The first region of interest (4010) is at least a portion of the palatal portion of the second virtual model (4000), extending no further than the edentulous ridge crest anteriorly and laterally, and extending no further than the soft palate (and more preferably no further than the vibrating line) posteriorly. The first region of interest (4010) is preferably at least 900 millimeters squared in size, such that there is sufficient surface area for subsequent steps, such as the selecting step (3825) and/or the aligning step (3835). For example, if the region of interest (4010) is less than 900 millimeters squared, an iterative closest point (ICP) algorithm may not be able to accurately align, e.g. the first virtual model (3900) to a virtual maxillary palatal form (4105).

The "ridge crest", the "soft palate", and the "vibrating line" are known anatomical landmarks in the field of dentistry. The "vibrating line" as defined herein is a line connecting left hamular notch, right hamular notch, and fovea palatinae. It has been determined that the first region of interest (4010) being within the boundary as described above is a region that is not prone to change following tooth extraction. That is, prior to the patient (3505) having teeth extracted, the first region of interest (4010) has approximately the same morphology as after having teeth extracted. Thus, it has been determined that this first region of interest (4010) advantageously serves to be utilized for positioning of the first virtual model (3900), such as by user visualization and manipulation (such as rotation and translation) of the first virtual model (3900) or by the automatic aligning process (to be described later).

In some embodiments, the first region of interest (4010) may be a palatal region, a palatal vault region, a premaxilla region, an incisive papilla region, a edentulous ridge region, and the like, or any combinations thereof. For example, a suitable first region of interest (4010) for a virtual mandibular model (not shown) may include a retromolar pad region, an edentulous ridge region, a lingual frenum region, a buccal frenum region, and the like, or any combinations thereof (not shown).

In one aspect, the first region of interest (4010) is outlined by user input, such as utilizing splines and/or paint tool. In another aspect, the first region of interest (4010) is be determined by an automatic determining process, such as using range image based segmentation, morphologic skeleton based, and the like. Since any given automatic segmentation method yields different segmented region of interest, a segmentation method for obtaining a virtual library of segmented regions of interest (e.g. segmented virtual palate form) may be utilized in automatic segmentation of a given target virtual model.

The first virtual model (3900), the second virtual model (4000), and/or the first region of interest (4010) may be stored in a non-volatile storage medium. Any suitable non-volatile storage medium may be utilized, including any storage medium(s) discussed in the present disclosure, such as, solid state storage (SSS), removable USB media, network based storage, the cloud, and the like. Any computing device, either locally available, in a local area network, wide area network, or a cloud, and the like may be utilized.

It will be understood that the defining step (3820) is preferred but not essential. Defining the first region of interest (4010) may be utilized for subsequent steps, for example, when the "fuzzy correspondences" method is to be employed.

Creating a Library of Palatal Forms

Figure 57:
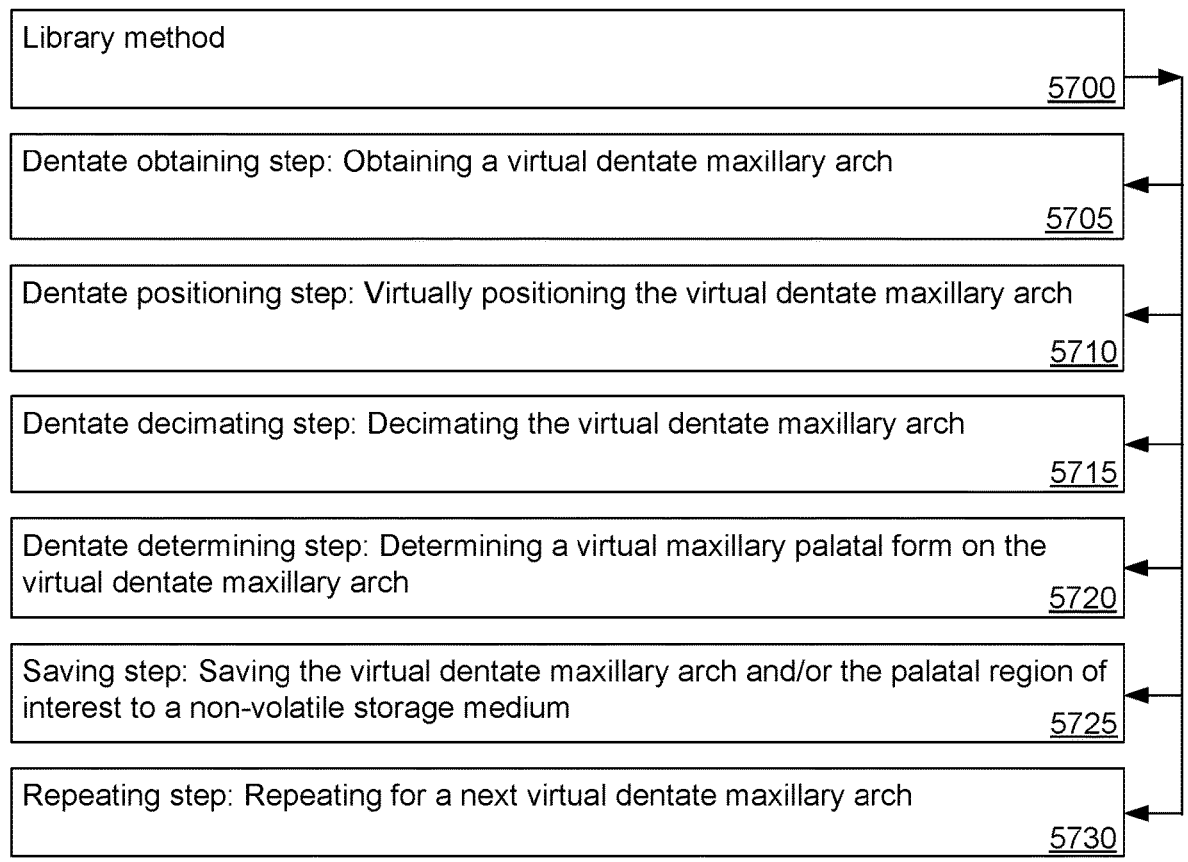
FIG. 57 is a flow chart illustrating a method for creation of a library of palatal forms.

Referring to FIG. 57, a method for creating the library of palatal forms, also referred to as library method (5700) is disclosed. The library method (5700) may include the steps of:

Dentate obtaining step (5705): Obtaining a virtual dentate maxillary arch;

Dentate positioning step (5710): Virtually positioning the virtual dentate maxillary arch;

Dentate decimating step (5715): Decimating the virtual dentate maxillary arch;

Dentate determining step (5720): Determining the virtual maxillary palatal form (4105) on the virtual dentate maxillary arch;

Saving step (5725): Saving the virtual dentate maxillary arch and/or the virtual maxillary palatal form (4105) to a non-volatile storage medium;

Repeating step (5730): Repeating for a next virtual dentate maxillary arch.

The dentate obtaining step (5705) is: Obtaining the virtual dentate maxillary arch.

Figure 52:
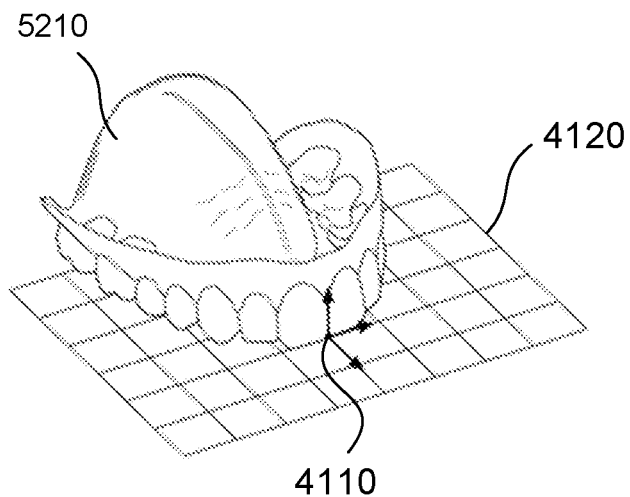
FIG. 52 is a top right perspective view of a virtual dentate maxillary arch, showing the virtual reference plane.

Referring to FIG. 52, for example, a dentate person's arch of teeth, such as maxillary arch (preferably with inclusion of the dentate person's teeth) may be digitized to obtain a virtual dentate maxillary arch (5210).

The dentate positioning step (5710) is: Virtually positioning the virtual dentate maxillary arch.

The virtual dentate maxillary arch (5210) may then be positioned (e.g. through rotation and translation) in relationship to a virtual reference point (4110). The virtual reference point (4110) may be any reference point in XYZ virtual space. A Z-axis (4112), Y-axis (4114), and X-axis (4116) may be associated with the virtual reference point (4110). Preferably, the virtual dentate maxillary arch (5210) may also be positioned relative to a virtual reference plane (4120), which preferably intersects with the virtual reference point (4110). For example, a dentate incisal plane of the virtual dentate maxillary arch (5210) may be positioned such that the dentate incisal plane is substantially parallel (within 10 degrees of) with the virtual reference plane (4120). In one implementation, the virtual reference point (4110) may be X,Y,Z coordinate point 0,0,0, and the virtual reference plane (4120) may be a virtual X-Y plane intersecting the virtual reference point (4110).

The dentate decimating step (5715) is: Decimating the virtual dentate maxillary arch.

Any method(s) and/or computer programs known in the art, such as any of those described in the present disclosure may be utilized to decimate the virtual denture maxillary palatal form (5410). For example, some searching algorithms, such as the "fuzzy correspondences" method described later utilize a low polygon count, such as 128 discrete points. Therefore, the decimation step (5715) facilitates efficient searching.

The dentate determining step (5720) is: Determining the virtual maxillary palatal form (4105) on the virtual dentate maxillary arch.

the virtual maxillary palatal form (4105) on the virtual dentate maxillary arch (5720) may be obtained by known methods, such as splines, paint tool, and/or automatic segmentation algorithm(s). The virtual maxillary palatal form (4105) may be defined as a palatal region on the virtual dentate maxillary arch not extending to any tooth laterally, and extending no further than the soft palate posteriorly.

The saving step (5725) is: Saving the virtual dentate maxillary arch (5210) and/or the virtual maxillary palatal form (4105) to a non-volatile storage medium.

The virtual dentate maxillary arch (5210) and/or the virtual maxillary palatal form (4105) may be saved to a non-volatile storage medium, which may be any storage medium as described in this description.

The repeating step (5730) is: Repeating for a next virtual dentate maxillary arch.

The repeating step (5730) involves optionally repeating the dentate obtaining step (5705) to the repeating step (5730) for the next virtual dentate maxillary arch.

Figure 53:
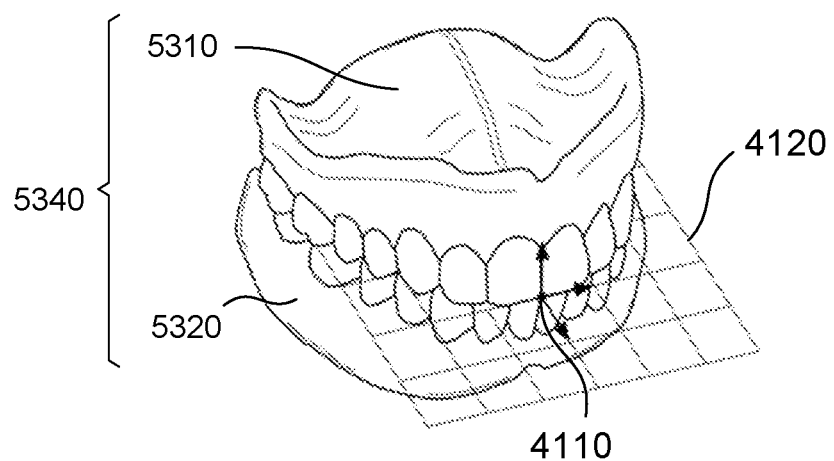
FIG. 53 is a top right perspective view of a virtual pair of dentures, showing the virtual reference plane.

Referring to FIG. 53, alternatively, a sample denture or a virtual pair of dentures (5340) including a sample maxillary denture (5310) and a sample mandibular denture (5320) may be utilized to create the library. That is, for example, in the dentate obtaining step (5705) to the repeating step (5730), the sample maxillary denture (5310) may be utilized lieu of the dentate person's maxillary arch. For example, the virtual pair of dentures (5340) may be temporarily attached together utilizing any materials to obtain a correct relationship against each other. For example, the virtual pair of dentures (5340) may be temporarily attached against each other in the mouth (3515) of the patient (3505) by placing bite registration material (such as silicone bite registration material) between the virtual pair of dentures (5340), and having the individual bite down into the bite registration material. The virtual pair of dentures (5340) may be digitized using any digitizing process known in the art, such as any of those discussed in the present disclosure. Thus, the term "dentate", as described in reference to steps the dentate obtaining step (5705) to the repeating step (5730) indicates either natural teeth or denture teeth.

As shown in FIG. 53, the sample maxillary denture (5310) and sample mandibular denture (5320) when taken together, form the virtual pair of dentures (5340). The virtual pair of dentures (5340) may be positioned relative to the virtual reference point (4110) and/or the virtual reference plane (4120).

Figure 54:
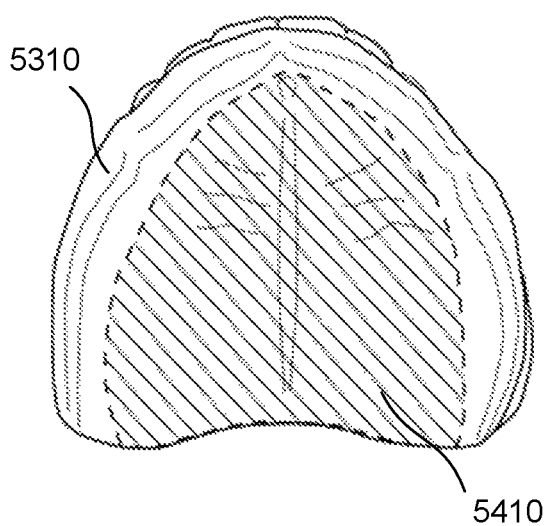
FIG. 54 is a top view of the virtual pair of dentures of FIG. 53.

Referring to FIG. 54, the maxillary denture palatal form (5410), marked in hashed and bound by dashed line boundary may be defined by depth of tray channel laterally, and vibrating line posteriorly. In some embodiments, the maxillary denture palatal form (5410) may include, but is not limited to, a hard palate area, a palatal vault area, a rugae area, an incisive papilla area, a tuberosity area, an edentulous ridge area, and the like, and any combinations thereof.

Figure 55:
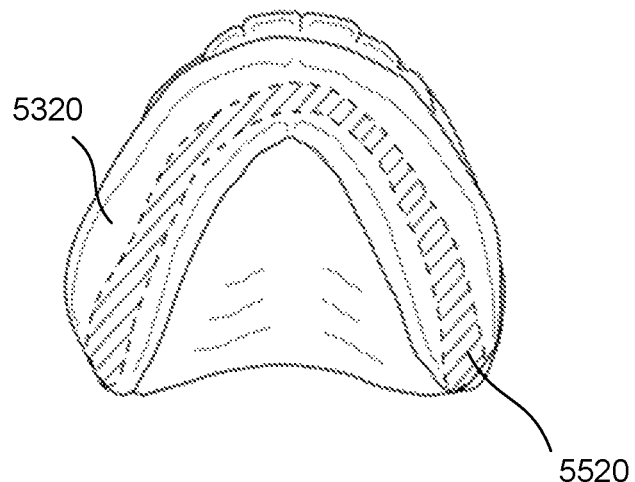
FIG. 55 is a bottom view of the virtual pair of dentures of FIG. 53.

In FIG. 55, a virtual mandibular ridge form (5520), marked in hashed and bound by dashed line boundary may be defined by 2 millimeters to 15 millimeters (in Buccolingual direction) from ridge crest. In some embodiments, the virtual mandibular ridge form (5520) may include, but is not limited to, a retromolar pad area, an anterior edentulous ridge area, a posterior edentulous ridge area, a lingual frenum area, and the like, and any combinations thereof.

Figure 56:
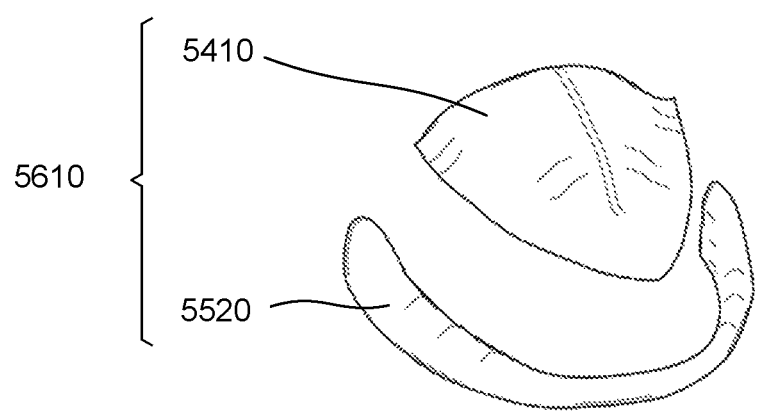
FIG. 56 is a top right perspective view of a virtual palate-ridge composite.

In FIG. 56, in some embodiments, the maxillary denture palatal form (5410) and virtual mandibular ridge form (5520) may be taken together to form a virtual palate-ridge composite (5610). The maxillary denture palatal form (5410) and virtual mandibular ridge form (5520) is shown in front right perspective view.

Because the virtual pair of dentures (5340) may have been previously positioned to the virtual reference plane (4120) (as shown in FIG. 53), the maxillary denture palatal form (5410), the virtual mandibular ridge form (5520), and/or the virtual palate-ridge composite (5610) may also be therefore positioned relative to the virtual reference plane (4120) and/or the virtual reference point (4110). The virtual palate-ridge composite (5610) may be saved in non-volatile storage medium, and utilized for the purpose of positioning the first virtual model (3900), and/or mandibular virtual model (not shown), such that a tentative position may be obtained between the two virtual models.

The virtual mandibular ridge form (5520), and/or the virtual palate-ridge composite (5610) may also be decimated.

Once this tentative position is obtained, the tray appliance system (see FIG. 20) may be fabricated, for example, utilizing the model obtaining step (3805) to the fabricating step (3860).

The maxillary denture palatal form (5410) may be used as the virtual maxillary palatal form (4105).

It should be noted that, in some embodiments, each virtual palatal form, such as the virtual maxillary palatal form (4105) within the library had been derived from aligned digital representations of different individuals' maxillary jaw. Therefore, each palatal form had been aligned relative to the virtual reference point (4110) and/or the virtual reference plane (4120). In some embodiments, one or more virtual maxillary palatal form (4105) may be modified from existing data. For example, some individuals may present with an asymmetric palatal form or asymmetric arch form, therefore, fine tuning of the palatal library may be conducted to remove confounding factors, such as palatal rugae, palatal torus, and the like. In some embodiments, one or more virtual maxillary palatal form (4105) may be formed virtually without being derived from real human individual. This may be particularly useful for generating outlier situations, such as extra large or small palatal forms, or palatal forms having anatomic anomalies, such as palatal tori.

Additionally, racial, ethnic, facial height, facial width, stature, gender information and the like, or any combinations thereof may be obtained, and associated with, for example, different libraries, such that a population based library or libraries can be created.

Thus the library of palatal forms, created by way of the library method (5700) may include at least two (2) virtual palatal forms, which have been previously positioned relative to the virtual reference point (4110) and/or the virtual reference point (4120). It will be understood that the library of palatal forms may include additional data, such as 3D data representative of teeth and/or maxillary ridge crest. For example, it is contemplated that the virtual dentate maxillary arch (5210) may be utilized as the virtual maxillary palatal form (4105) without further definition of region of interest.

Figure 38:
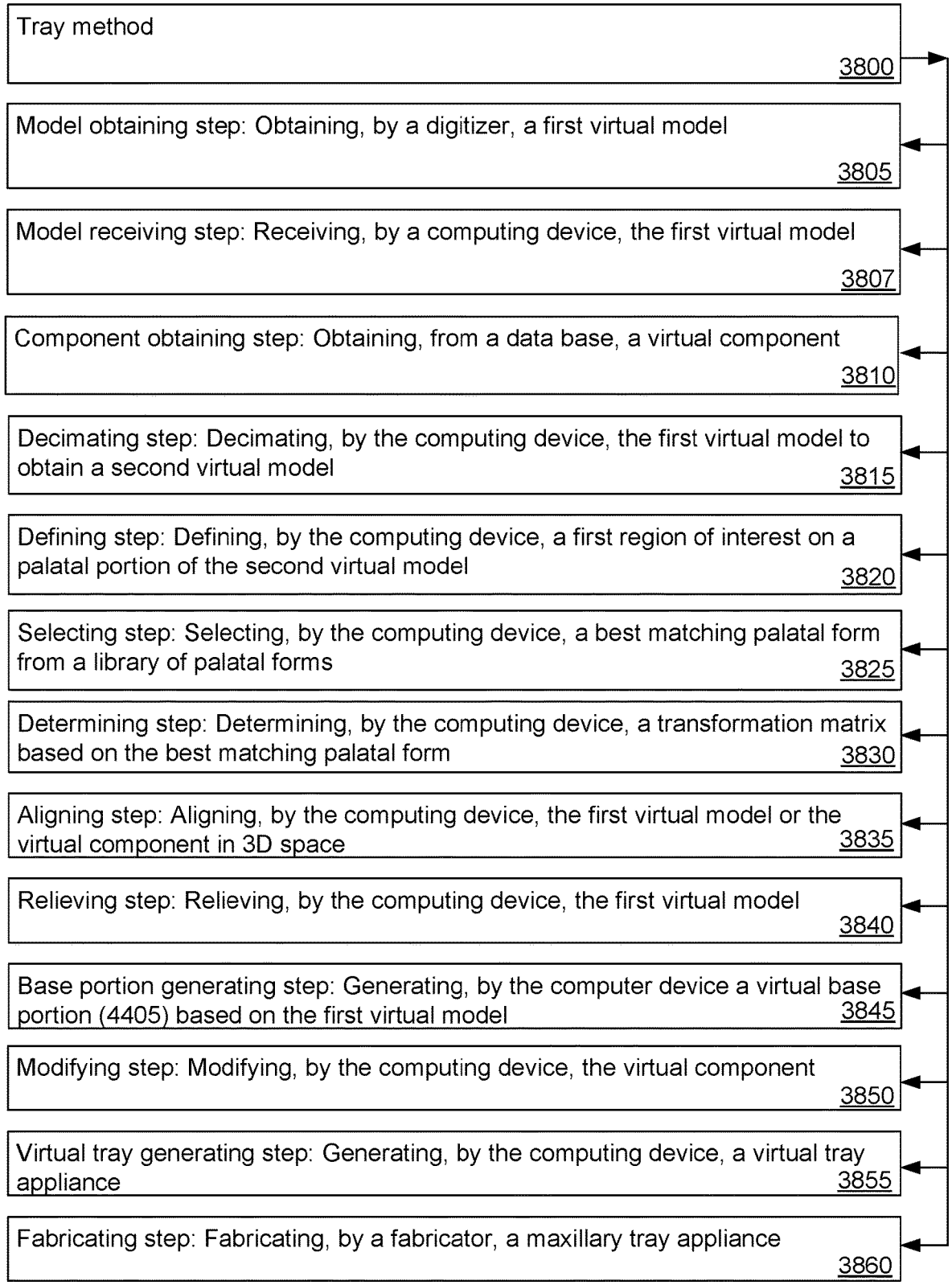
FIG. 38 is a flow chart illustrating a method leading to fabrication of a maxillary tray appliance.

Returning now to FIG. 38, the selecting step (3825) is selecting, by the computing device (3705), the best fitting palatal form from the library of palatal forms (such as created utilizing the library method (5700)). Herein, the library of palatal forms may be also referred to simply as "library".

In one aspect, the best fitting palatal form may be selected by, e.g. visualization by the user, using software executed by the computing device (3705). For example, the first region of interest (4010) may be visually assessed against each of the palatal forms within the library of palatal forms to determine the best fitting palatal form. In another aspect, the best fitting palatal form may be selected utilizing an automatic selecting process.

It is a problem that palatal vaults have varying dimensions, such as height, length, and width. Therefore, for example, the library of palatal forms, having different dimensions may be utilized. An algorithm, such as the "fuzzy correspndences" method, may be utilized in the selecting step (3825) to select the best fitting palatal form from the library.

For the selecting step (3825), the "Fuzzy Correspondences" method (Kim V, Li W, Mitra N, DiVerdi S, Funkhouser T (2012) Exploring collections of 3D models using fuzzy correspondences. ACM Trans Graph), incorporated herein by reference in its entirety, may be utilized in methods of the present invention. It will be understood that any searching algorithm may be employed for the purpose of selecting the best fitting palatal form.

Referring to FIG. 40, the first region of interest (4010), may be utilized as a region of interest (ROI) in the aforementioned process to select a best fitting palatal form. Once the best fitting palatal form is selected, the same region (or a similar region) may be utilized to be aligned to the best fitting palatal form.

It will be understood that any suitable computer algorithm known in the art capable of determining a best fitting set of geometric data within the library based on a target set of geometric data may be employed in the selecting step (3825). Such computer algorithms include, but are not limited to, for example, any non-rigid shape recognition algorithms. For example, metric approach to shape recognition, point matching algorithm.

The determining step (3830) is determining, by the computing device, a transformation matrix based on the best fitting palatal form. Once the best fitting palatal form is selected from the library of palatal forms, a transformation matrix can be calculated by the computing device (3705). One suitable method for determining the transformation matrix is using the iterative closest point (ICP) algorithm, as known in the art. For example, the transformation matrix may be determined by utilizing the iterative closest point (ICP) algorithm on the basis of positional differences in 3D space between individual points making up the first region of interest (4010) and individual points making up the best fitting palatal form. The iterative closest point (ICP) algorithm is well known in the art, and any variant and/or equivalent may be utilized. Commercially available computer programs may be utilized in the determining step (3830), such as MESHLAB, GEOMAGIC STUDIO, and the like. The Iterative closest point (ICP) algorithm may be used as the automatic aligning process of the first virtual model (3900).

The aligning step (3835) is aligning, by the computing device, the first virtual model (3900) or the virtual component (4510) in 3D space. In one aspect, the first virtual model (3900) may be aligned using the transformation matrix determined in the determining step (3830). For example, referring to FIG. 42, the first virtual model (3900) may be aligned to the virtual reference point (4110), and/or the virtual reference plane (4120). In another aspect, the first virtual model (3900) may be aligned in 3D space utilizing user input on the basis of anatomic landmarks on the first virtual model (3900), such as utilizing the virtual model reference plane (4305). In yet another aspect, the first virtual model (3900) may be aligned in 3D space utilizing user input on the basis of extra-oral anatomic landmarks.

Thus, the aligning step (3835) may be based on user input. For example, the user may utilize an input device, such as a keyboard, a mouse, a trackpad, a graphic tablet, a 3D mouse, a haptic device, a non-contact input device, a virtual reality unit, and to the computing device (3705).

Figure 42:
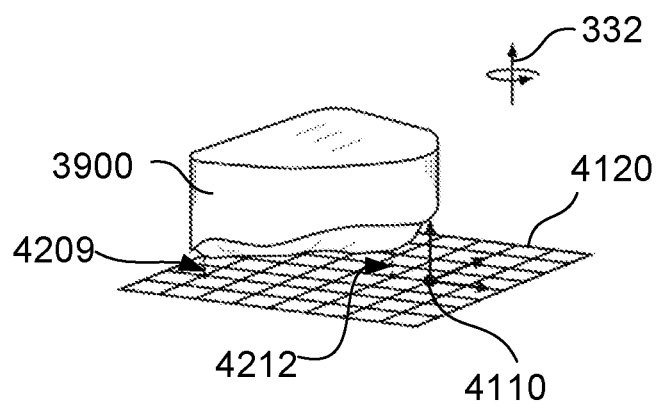
FIG. 42 is a top right perspective view of the first virtual model of FIG. 39, showing alignment to a virtual reference point.
Figure 43B:
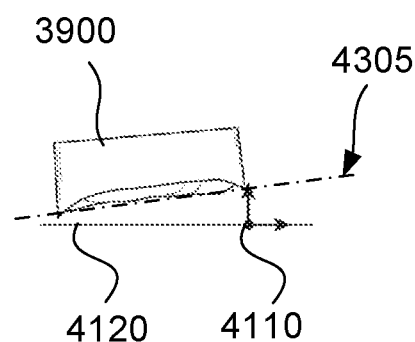
FIG. 43B is the right side perspective view of the first virtual model of FIG. 43A showing an implementation wherein a virtual model reference plane is 5 degrees to 20 degrees to a virtual reference plane.
Figure 44:
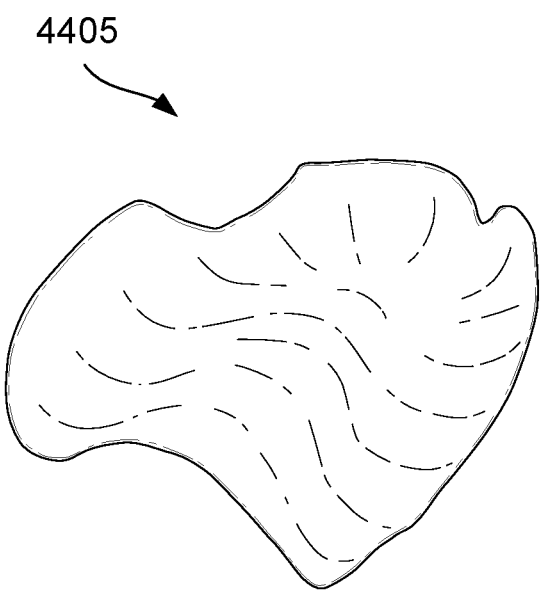
FIG. 44 is a bottom right perspective view of a virtual base portion.
Figure 45:
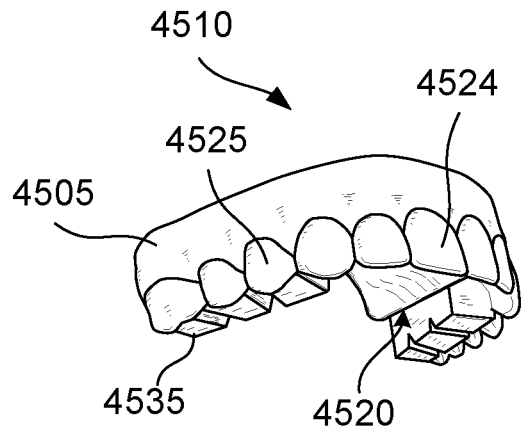
FIG. 45 is a bottom right perspective view of a virtual component.

As shown in FIG. 39, the first virtual model (3900) includes a virtual model sagittal midline (3901), which is identifiable by anatomical landmark(s), such as a virtual model mid-palatine suture (3905) in bottom view. The first virtual model (3900) additionally includes a virtual model transverse midline (3902), which is defined as a center line between a maxillary edentulous ridge anterior end (3907) and an imaginary line connecting a virtual model left hamular notch (3908) and a virtual model right hamular notch (3909). The virtual maxillary model (3900) additionally includes a virtual model incisive papilla (3912). For example, the virtual model left hamular notch (3908), the virtual model right hamular notch (3909) and the virtual model incisive papilla (3912) may define a virtual model reference plane (4305). The virtual model reference plane (4305) is shown in one dot dashed line in FIG. 43A, FIG. 43B, FIG. 60, and FIG. 61. As shown in FIG. 43B, the first virtual model (3900) may be positioned relative to the virtual reference plane (4120), such that the virtual model reference plane (4305) and the virtual reference plane (4120) are substantially parallel. In FIG. 42, right hamular notch distance (4209) and incisive papilla distance (4212), shown in dashed line, illustrate distances between the virtual model right hamular notch (3909) and virtual model incisive papilla (3912) to the virtual reference plane (4120), respectively.

The virtual model reference plane (4305) serves to provide an anatomical based estimate of the orientation of the camper's plane of the patient (3505). Alternative landmarks may be utilized for defining the virtual model reference plane (4305), such as a palatal region, a palatal vault region, a premaxilla region, an incisive papilla region, a edentulous ridge region, and the like.

The virtual model incisive papilla (3912) is defined as the center most point of an anatomical incisive papilla in bottom view of the first virtual model (3900).

Alternatively, for example, the first virtual model (3900) may be aligned by user visual alignment. For example, in posterior view, the first virtual model (3900) may be aligned to the virtual reference plane (4120) such that the virtual model left hamular notch (3908) and virtual model right hamular notch (3909) are substantially the same distance to the virtual reference plane (4120). For example in side view (see FIG. 43A), the first virtual model (3900) may be aligned to the virtual reference plane (4120) such that the virtual model reference plane (4305) is substantially parallel with the virtual reference plane (4120).

When the impression material is not to be used with the maxillary tray appliance (110), If the virtual model reference plane (4305) is not substantially parallel with the virtual reference plane (4120), anterior-posterior shifting of the contact point between the second contacting portion (1620) and the first contacting portion (120) would yield different vertical dimensions (different distances between the maxillary jaw and the mandibular jaw). Thus, the virtual model reference plane (4305) being substantially parallel with the virtual reference plane (4120) allows for providing the same occlusal vertical dimension regardless of jaw discrepancies (retrognathic, orthognathic, or prognathic jaw configuration)

Referring to FIG. 43B, in some embodiments, an upward angulation of between 5 degrees and 20 degrees may be provided between the virtual model reference plane (4305) and the virtual reference plane (4120). Since during the process of impression taking, there is a tendency for more impression material too gather in a posterior portion of the maxillary tray appliance (110) than an anterior portion, providing the upward angulation of between 5 degrees and 20 degrees advantageously allows the incisal plane (310) of the maxillary tray appliance (110) to be parallel with the Camper's plane of the patient (3505) following the impression taking procedure, and thus would allow for less adjustments necessary to the maxillary tray appliance (110) and would allow for the jaw registration procedure to be more accurate.

In some embodiments, the first virtual model (3900) may be visualized in cross sectional view, such as through virtual model sagittal midline (3901) or through the virtual model transverse midline (3902), such that the palatal portion (as defined by the first region of interest (4010)) may be utilized for user visual alignment.

In some embodiments, extra-oral landmarks may be used for alignment. For example, a "papillometer" may be utilized for alignment of the first virtual model (3900) in the maxillary apical direction (332). For example, a "Fox plane" may be utilized for alignment of the first virtual model (3900) in angulation (such as roll, pitch, yaw) relative to the virtual reference plane (4120).

Figure 59:
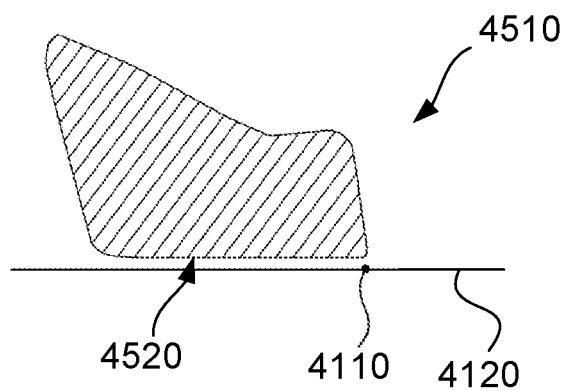
FIG. 59 is the side cross sectional view of FIG. 58 showing one possible alignment of the virtual reference point and the virtual reference plane.

FIG. 59 shows the virtual contacting surface (4520) in one preferred relationship with the virtual reference point (4110) and the virtual reference plane (4120). The virtual contacting surface (4520) is preferably substantially parallel with the virtual reference plane (4120) in cross sectional view, such that when the first virtual model (3900) is aligned with the virtual reference plane (4120), the first virtual model (3900) is also aligned with the virtual contacting surface (5810).

Figure 60:
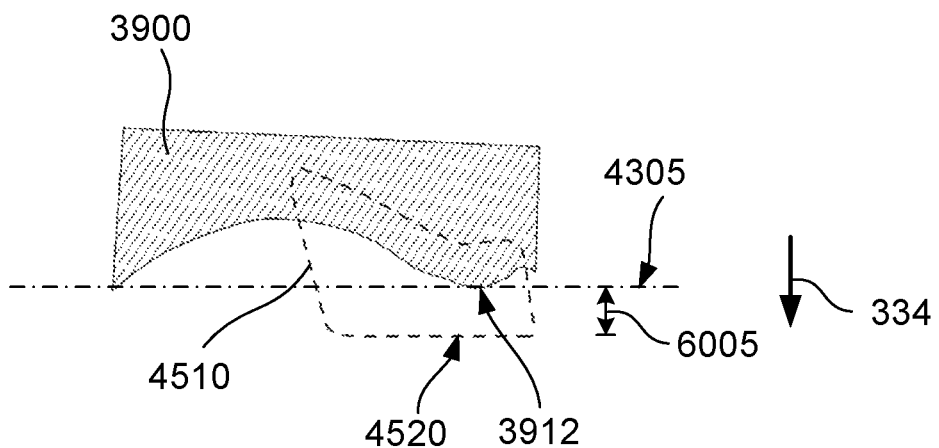
FIG. 60 is a side cross sectional view of the first virtual model through section 60-60 of FIG. 39 showing one possible alignment of the virtual component to the first virtual model.
Figure 61:
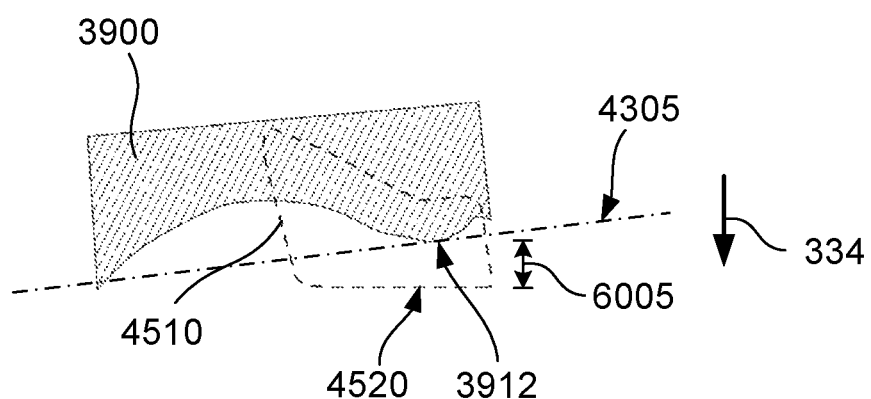
FIG. 61 is the side cross sectional view of the first virtual model of FIG. 60 showing another possible alignment of the virtual component to the first virtual model.

FIG. 60 shows a cross sectional view through section 60-60 in FIG. 39. In FIG. 60 and FIG. 61, an outline form of the virtual component (4510) is shown in dashed line, where the virtual contacting surface (4520) is shown as a portion of the virtual component (4510). As shown in FIG. 60, the first virtual model (3900) may be aligned relative to the virtual component (4510) such that the virtual contacting surface (4520) is substantially parallel with (within 10 degrees of) the virtual model reference plane (4305). This advantageously serves to allow the first contacting portion (120) to be substantially parallel to the Camper's plane of the patient (3505) during use (when impression material is not anticipated to pool in the posterior portion of the maxillary tray appliance (110), such as when no impression material is to be used).

FIG. 61 shows one implementation in which the first virtual model (3900) is aligned relative to the virtual component (4510) such that the virtual contacting surface (4520) is between 5 degrees and 20 degrees from the virtual contacting surface (4520). This advantageously serves to allow the first contacting portion (120) to be substantially parallel with the Camper's plane of the patient (3505) when impression material is thought to pool in the posterior portion of the maxillary tray appliance (110).

As shown in FIG. 60 and FIG. 61, the first virtual model (3900) may be aligned to the virtual component (4510) such that the virtual contacting surface (4520) is between 3 millimeters and 20 millimeters in the maxillary incisal direction (334) from the virtual model incisive papilla (3912). This is depicted by a virtual contacting surface vertical height (6005) in FIG. 60 and FIG. 61. This configuration advantageously allows the occlusal vertical dimension provided by the maxillary tray appliance (110) to be not too high and not too low during the jaw registration procedure, and/or hiding the first contacting portion (120) from view in a frontal view behind the central incisor tooth form (124).

The virtual bite material accepting portion (4535) may take any form as previously described for the bite material accepting portion (135), such as block form, cylindrical form, V-shaped form, and the like. The virtual tooth forms may take any form as previously described for the tooth forms (such as first premolar tooth form (125)). In one aspect, one virtual component (4510) may be stored in the data base (3710). In another aspect, a plurality of virtual components (4510) may be stored in the data base (3710), e.g. having different sizes and/or shapes. In yet another aspect, the plurality of virtual components (4510) may each be associated with different palatal forms within the library of palatal forms, such that, for example, a larger palatal form is associated with a larger virtual component. In other words, there may be at least two virtual components, such as a first virtual component and a second virtual component, each being morphologically distinct. The first virtual component and the second virtual component may be associated with a first palatal form and a second palatal form, respectively. This advantageously provides a suitably sized virtual component for the patient (3505).

Figure 48:
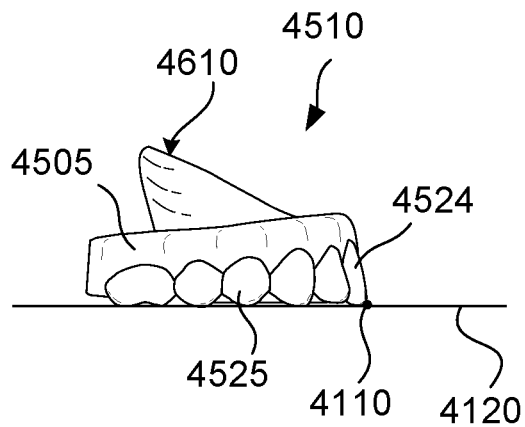
FIG. 48 is a side view of the virtual component of FIG. 45 showing one possible alignment to the virtual reference plane.

The virtual gum surface (4505) preferably takes the form of natural gum or gingiva in frontal view (see FIG. 46) and in side view (see FIG. 48).

Figure 46:
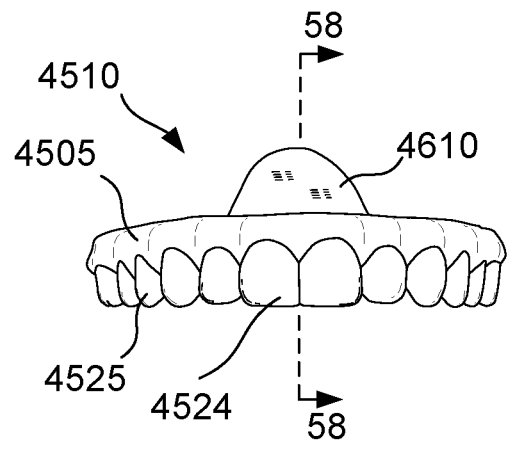
FIG. 46 is a front perspective view of the virtual component of FIG. 45.
Figure 47:
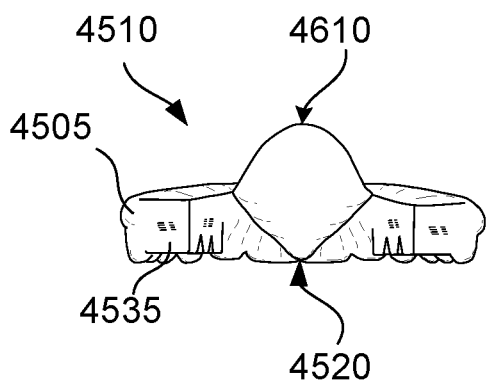
FIG. 47 is a rear perspective view of the virtual component of FIG. 45.

Referring to FIG. 46, the virtual component (4510) may additionally include a palatal extending surface (4610), upwardly extending from the virtual gum surface (4505) by at least 5 millimeters, such that there is no gap that develops between the first contacting portion (120) and the first base portion (115) when the maxillary tray appliance (110) is fabricated. This advantageously provides strength to the maxillary tray appliance, and thus provides a more accurate jaw registration procedure.

Figure 49:
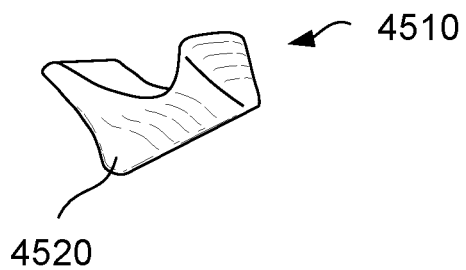
FIG. 49 is a bottom right perspective view of a virtual base portion having no tooth form according to the embodiment of FIG. 45.

Referring to FIG. 49, in some embodiments, the virtual component (4510) may not include any tooth form. For example, the virtual gum surface (4505), the virtual tooth form, and the like may be obtained in a separate virtual component.

Referring to FIG. 48, preferably, the virtual component (4510) is aligned to the virtual reference point (4110) and/or the virtual reference plane (4120), such that no rotation or translation is needed for alignment in relation to the first virtual model (3900).

In some implementations, the first virtual model (3900) may not be aligned to the virtual reference point (4110), but rather, the virtual component (4510) is aligned to the first virtual model (3900).

In one aspect, the virtual component (4510) may be a water tight polygon mesh. In another aspect, one or more virtual surfaces may be missing form the virtual component (4510). In yet another aspect, the virtual component (4510) may be in the form of displacement matrix or displacement map, such as a "bump map", and may be applied to a surface of the virtual base portion (4405).

The relieving step (3840) is relieving, by the computing device, the first virtual model (3900). Relieving the first virtual model (3900) may be provided by, for example an expansion tool or ballooning tool to provide increased room for the impression material.

The base portion generating step (3845) is generating, by the computer device a virtual base portion (4405) based on the first virtual model (3900). For example, a surface area of the first virtual model (3900) may be selected, such as using splines or brush tool, and a virtual base portion (4405) may be created using known method(s)

The modifying step (3850) is modifying, by the computing device (3705), the virtual component (4510). For example, the virtual component (4510) may be modified, such as through morphing, shaping, expanding, contracting, deforming, and the like, such that a suitable shape is formed (for example, shaping the virtual central incisor tooth form 4524).

The virtual tray generating step (3855) is generating, by the computing device (3705), a virtual tray appliance. For example, the virtual component (4510) may be joined to the virtual base portion (4405) by, e.g., Boolean addition to generate the virtual tray appliance. The virtual tray appliance may be in any file format, such as .stl, .obj, and the like. The virtual tray appliance may be in the form of build instructions, such as G-code.

The fabricating step (3860) is fabricating, by the fabricator (3700) the maxillary tray appliance (110). As described previously, the fabricator (3700) may be any known fabricator, such as addition type fabricator or subtraction type fabricator. In the fabricating step (3860), the virtual tray appliance generated in the virtual tray generating step (3855) is delivered to the fabricator (3700) to fabricate the maxillary tray appliance (110). Any method known in the art may be utilized to deliver the virtual tray appliance to the fabricator (3700), such as through a physical connection, such as universal serial bus (USB), or through network, such as local area network, wide area network or wireless network. Alternatively, the virtual tray appliance may be transferred to the fabricator using physical means, such as SD card.

Figure 50:
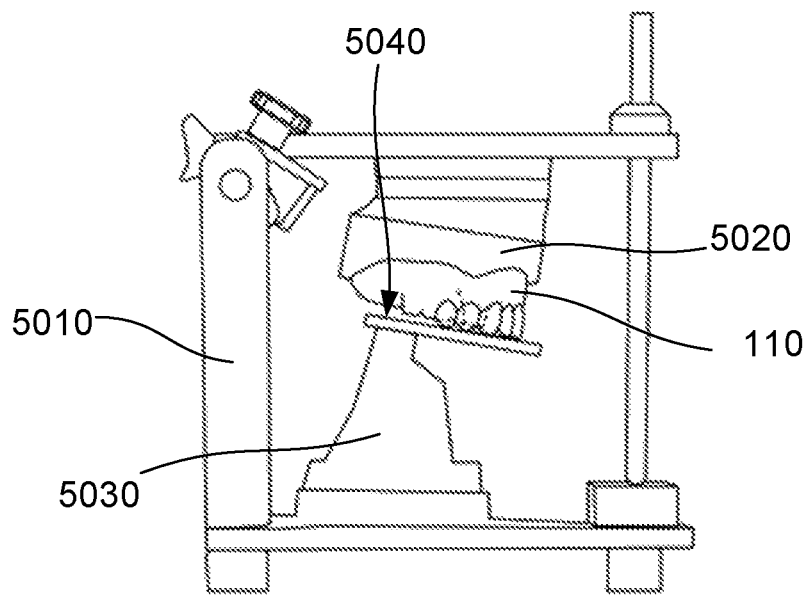
FIG. 50 is a side view of an articulator being used to attach a maxillary physical model to the articulator.

Referring to FIG. 50, once the maxillary tray appliance (110) had been used in the mouth (3515) of the patient (3505) for taking a maxillary impression (5110) and/or receiving a maxillo-mandibular bite record (5130), the maxillary tray appliance (110) may be used to position a maxillary physical model (5020). The maxillary physical model (5020) may be obtained by either pouring the maxillary tray appliance (110) with a suitable dental stone, or pouring another impression taken with another tray with the suitable dental stone. Once the maxillary physical model (5020) is obtained, the maxillary tray appliance (110) may be used to carry the maxillary physical model (5020) to an articulator (5010) using a mounting stand (5030). As shown in FIG. 50, the mounting stand (5030) may have a flat top surface (5040), such that the flat top surface (5040) can accept the incisal plane (310) of the maxillary tray appliance (110).

Specifically, the maxillo-mandibular bite record (5130) may be any bite registration material mentioned above, using any bite registration method mentioned above.

Importantly, when the maxillary physical model (5020) is to be poured directly from the maxillary tray appliance (110), the maxillary physical model (5020) (such as pouring the suitable dental stone in the maxillary impression (5110) taken with the maxillary tray appliance (110)), the maxillary physical model (5020) is preferably not taken off of the maxillary tray appliance (110) until after the maxillary physical model (5020) has been rigidly attached to the articulator (5010).

Figure 51:
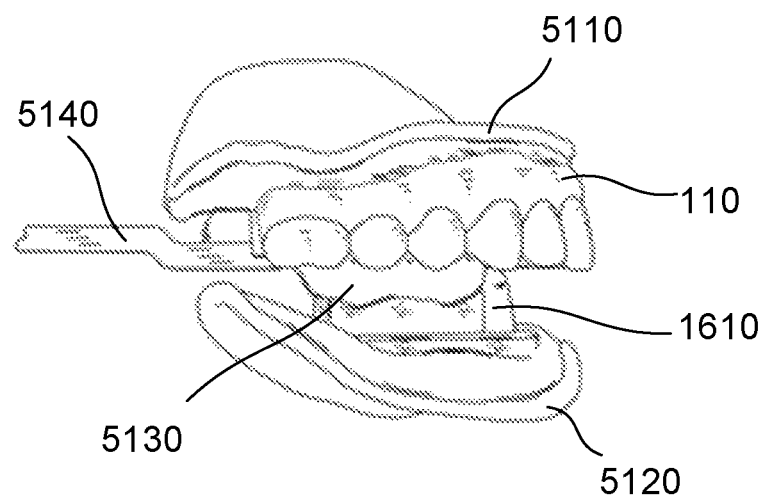
FIG. 51 is a side view of the tray appliance system including both the maxillary tray appliance and mandibular tray appliance being attached to a support plate.

Referring to FIG. 51, alternatively, the maxillary tray appliance (110) and/or the mandibular tray appliance (1610) may be digitized, such that a dental prosthesis can be made. For example, the maxillary tray appliance (110) may be lined by the maxillary impression (5110), and the mandibular tray appliance (1610) may be lined by the mandibular impression (5120), and the maxillary tray appliance (110) and mandibular tray appliance (1610) may be oriented relative to each other using the maxillo-mandibular bite record (5130). A support plate (5140) may then be attached to the maxillary tray appliance (110) and/or the mandibular tray appliance (1610) using any means, such as light cured resin, a clip, a hub and receptacle assembly and the like. The support plate (5140) may then be attached to a digitization device, such as the digitizer (3735) mentioned above. Once the assembly as outlined in FIG. 51 has been digitized, any known method may be employed for fabrication of one or more dental prosthesis.

The above-described embodiments including the drawings are examples of the invention and merely provide illustrations of the invention. Other embodiments will be obvious to those skilled in the art. Thus; the scope of the invention is determined by the appended claims and their legal equivalents rather than by the examples given.

INDUSTRIAL APPLICABILITY

The invention has application to the dental industry.

What is claimed is:

1. A method of fabricating a maxillary tray appliance, the method comprising the steps of:
obtaining, by a digitizer, a first virtual model of an edentulous maxillary gum of a patient;
obtaining, from a data base, a virtual component, wherein the virtual component comprises a virtual contacting surface, the virtual contacting surface is a jaw alignment component adjacent to and in contact with a virtual gum of the first virtual model, the jaw alignment component configured to extend downwardly from the virtual gum surface, and the virtual contacting surface selected from the group consisting of: ridge type, plate type, and pin type;
receiving, by a computing device, the first virtual model;
aligning, by the computing device, the first virtual model or the virtual component in 3D space;
generating, by the computing device, a virtual tray appliance; and
fabricating, by a fabricator, a maxillary tray appliance using the virtual tray appliance.

2. A method of fabricating a maxillary tray appliance, the method comprising the steps of:
obtaining, by a digitizer, a first virtual model of an edentulous maxillary gum of a patient;
obtaining, from a data base, a virtual component, wherein the virtual component comprises a virtual contacting surface, the virtual contacting surface selected from the group consisting of: ridge type, plate type, and pin type;
receiving, by a computing device, the first virtual model;
aligning, by the computing device, the first virtual model or the virtual component in 3D space;
generating, by the computing device, a virtual tray appliance; and
fabricating, by a fabricator, a maxillary tray appliance using the virtual tray appliance;
decimating, by the computing device, the first virtual model to obtain a second virtual model;
defining, by the computing device, a first region of interest on a palatal portion of the second virtual model;
selecting, by the computing device, a best fitting palatal form from a library of palatal forms;
determining, by the computing device, a transformation matrix based on the best fitting palatal form;
generating, by the computing device a virtual base portion based on the first virtual model; and
wherein the step of aligning is based on the transformation matrix.

3. The method of claim 2, further comprising the steps of:
relieving, by the computing device, the first virtual model; and
modifying, by the computing device, the virtual component.

4. The method of claim 2, wherein the step of aligning is based on an automatic aligning process.

5. The method of claim 4, wherein the automatic aligning process is an iterative closest point algorithm.

6. The method of claim 2, wherein the step of selecting is based on an automatic selecting process.

7. The method of claim 6, wherein the automatic selecting process is a fuzzy correspondences method.

8. The method of claim 2, wherein the library of palatal forms is obtained by the steps of:
obtaining a virtual dentate maxillary arch;
virtually positioning the virtual dentate maxillary arch;
saving the virtual dentate maxillary arch; and
repeating for a next virtual dentate maxillary arch.

9. The method of claim 8, wherein at least two virtual components are stored in the data base, each being morphologically distinct, and each being associated with distinct palatal forms within the library of palatal forms, respectively.

10. The method of claim 2, wherein the library of palatal forms is obtained by the step of: determining a virtual maxillary palatal form on the virtual dentate maxillary arch.

11. The method of claim 1,
wherein the step of aligning is based on a virtual model reference plane; the virtual model reference plane being defined by: (a) a virtual model left hamular notch, (b) a virtual model right hamular notch, and (c) a virtual model incisive papilla; and
wherein the virtual contacting surface defines a virtual contacting surface in cross sectional view.

12. The method of claim 11, wherein the virtual model reference plane is substantially parallel with the virtual contacting surface in cross sectional view.

13. The method of claim 11, wherein the virtual model reference plane is between 5 degrees and 20 degrees from the virtual contacting surface in cross sectional view.

14. The method of claim 11, wherein the virtual contacting surface is between 3 millimeters and 20 millimeters in a maxillary incisal direction from the virtual incisive papilla.

15. The method of claim 1, wherein the step of aligning is based on user input.

16. The method of claim 2,
   wherein the virtual contacting surface is the ridge type; and
   wherein the virtual contacting surface is substantially straight in cross sectional view.

17. The method of claim 1, wherein the virtual component additionally defines at least one tooth form.

18. The method of claim 17, wherein the at least one tooth form is a first premolar tooth form, and the first premolar tooth form has no lingual cusp.

\* \* \* \* \*